United States Patent
Barriac et al.

(10) Patent No.: US 10,111,226 B2
(45) Date of Patent: Oct. 23, 2018

(54) TECHNIQUES TO IDENTIFY PACKETS ASSOCIATED WITH AN OVERLAPPING BASIC SERVICE SET

(71) Applicant: QUALCOMM Incorporated, San Diego, CA (US)

(72) Inventors: Gwendolyn Denise Barriac, Encinitas, CA (US); Alfred Asterjadhi, San Diego, CA (US); Simone Merlin, San Diego, CA (US); George Cherian, San Diego, CA (US); Yan Zhou, San Diego, CA (US); Gang Ding, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 15/245,891

(22) Filed: Aug. 24, 2016

(65) Prior Publication Data
US 2017/0064713 A1 Mar. 2, 2017

Related U.S. Application Data

(60) Provisional application No. 62/210,265, filed on Aug. 26, 2015.

(51) Int. Cl.
*H04W 4/00* (2018.01)
*H04W 72/04* (2009.01)
(Continued)

(52) U.S. Cl.
CPC ....... *H04W 72/0453* (2013.01); *H04L 5/0053* (2013.01); *H04L 61/6022* (2013.01);
(Continued)

(58) Field of Classification Search
CPC .............. H04W 72/0453; H04W 84/12; H04L 5/0053; H04L 61/6022; H04L 69/22; H04L 5/0007; H04L 5/0062; H04L 2012/5648
See application file for complete search history.

(56) References Cited

U.S. PATENT DOCUMENTS 9,071,474 B1 * 6/2015 Zhang ................. H04L 25/0226
9,344,312 B2 * 5/2016 Seok .................... H04L 27/2602
(Continued)

FOREIGN PATENT DOCUMENTS

WO   WO-2015120488 A1   8/2015

OTHER PUBLICATIONS

ISA/EP, International Search Report and Written Opinion of the International Searching Authority, Int'l Application No. PCT/US2016/048536, dated Nov. 7, 2016, European Patent Office, Rijswijk, NL, 13 pgs.

*Primary Examiner* — Stephen M D Agosta
(74) *Attorney, Agent, or Firm* — Holland & Hart LLP/Qualcomm

(57) ABSTRACT

A wireless device may utilize enhanced OBSS identification techniques to determine whether an interfering transmission is associated with an OBSS. In an example, a wireless device may receive a WLAN packet that includes a preamble and a data region. The wireless device may analyze the preamble to determine whether the WLAN packet is an OBSS packet. If the wireless device determines there is insufficient information in the preamble to identify the WLAN packet as an OBSS packet, the wireless device may decode a portion of the data region (e.g., a MAC header) to determine if the WLAN packet is an OBSS packet. Prior to declaring a successful decoding of the MAC header, the wireless device may confirm the MAC header has been received reliably. Additionally or alternatively, BSS identifiers may be
(Continued)

included in the data region and used to determine if the WLAN packet is associated with an OBSS.

28 Claims, 12 Drawing Sheets

(51) Int. Cl.
    *H04L 29/06*     (2006.01)
    *H04L 29/12*     (2006.01)
    *H04L 5/00*     (2006.01)
    *H04W 84/12*     (2009.01)
    *H04L 12/70*     (2013.01)

(52) U.S. Cl.
    CPC .......... *H04L 69/22* (2013.01); *H04L 5/0007* (2013.01); *H04L 5/0062* (2013.01); *H04L 2012/5648* (2013.01); *H04W 84/12* (2013.01)

(56) References Cited

U.S. PATENT DOCUMENTS

| | | | | |
|---|---|---|---|---|
| 9,369,918 | B2 * | 6/2016 | Grandhi | H04W 28/06 |
| 2004/0101068 | A1 * | 5/2004 | Wang | H04B 1/7093 |
| | | | | 375/324 |
| 2004/0141490 | A1 * | 7/2004 | Hong | H04W 74/06 |
| | | | | 370/345 |
| 2008/0159205 | A1 * | 7/2008 | Sekiya | H04L 1/1685 |
| | | | | 370/328 |
| 2011/0219452 | A1 * | 9/2011 | Porter | H04L 63/1425 |
| | | | | 726/23 |
| 2012/0163349 | A1 * | 6/2012 | Fontaine | H04W 72/1263 |
| | | | | 370/336 |
| 2013/0229996 | A1 * | 9/2013 | Wang | H04W 72/0413 |
| | | | | 370/329 |
| 2014/0016478 | A1 * | 1/2014 | Koskela | H04W 48/16 |
| | | | | 370/241 |
| 2014/0056204 | A1 * | 2/2014 | Suh | H04W 72/1226 |
| | | | | 370/312 |
| 2014/0286203 | A1 | 9/2014 | Jindal et al. | |
| 2014/0341128 | A1 * | 11/2014 | Turtinen | H04W 28/18 |
| | | | | 370/329 |
| 2014/0362935 | A1 * | 12/2014 | Porat | H04L 27/2602 |
| | | | | 375/260 |

* cited by examiner

TECHNIQUES TO IDENTIFY PACKETS ASSOCIATED WITH AN OVERLAPPING BASIC SERVICE SET

CROSS REFERENCES

The present application for Patent claims priority to U.S. Provisional Patent Application No. 62/210,265 by Barriac, et al., entitled "Techniques To Identify Packets Associated With An Overlapping Basic Service Set," filed Aug. 26, 2015, assigned to the assignee hereof.

BACKGROUND

The following relates to wireless communication, and more specifically to techniques to identify interfering packets received at a wireless device that are associated with an overlapping basic service set (OBSS).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a wireless fidelity (Wi-Fi) (i.e., IEEE 802.11) network may include an access point (AP) that may communicate with one or more stations (STAs) or mobile devices. An AP, and STAs associated with the AP, may be referred to as a basic service set (BSS). The AP may be coupled to a network, such as the Internet, and may enable a mobile device to communicate via the network (or communicate with other devices coupled to the access point). A wireless device may communicate with a network device bi-directionally. For example, in a WLAN, a station (STA) may communicate with an associated AP via downlink (DL) and uplink (UL). The DL (or forward link) may refer to the communication link from the AP to the station, and the UL (or reverse link) may refer to the communication link from the station to the AP.

In some cases, a network may include multiple BSSs whose coverage areas overlap with one another. Transmissions from an OBSS may interfere with transmissions in a neighboring BSS. Therefore, an AP or STA may scan for OBSSs and may enable or disable a transmission mode (e.g., 40 MHz operation) based at least in part on identifying an OBSS. In some cases, if a wireless device spends too much time deciding if packets are OBSS, the wireless device may fail to fully utilize available resources and network throughput may be decreased.

SUMMARY

A wireless device may utilize enhanced OBSS identification techniques to determine whether an interfering transmission is associated with an OBSS. In an example, a wireless device may receive a WLAN packet that includes a preamble and a data region. The wireless device may analyze the preamble to determine whether the WLAN packet is an OBSS packet. If the wireless device determines there is insufficient information in the preamble to identify the WLAN packet as an OBSS packet, the wireless device may decode a portion of the data region (e.g., a MAC header) to determine if the WLAN packet is an OBSS packet. Prior to declaring a successful decoding of the MAC header, the wireless device may confirm the MAC header has been received reliably (e.g., via an frame check sequence (FCS), cyclic redundancy check (CRC), etc.). Additionally or alternatively, BSS identifiers may be included in the data region and used to determine if the WLAN packet is associated with an OBSS. After identifying an OBSS packet, the wireless device may discard collision-based parameters and reuse the frequency spectrum.

A method of wireless communication is described. The method may include receiving a wireless local area network (WLAN) packet comprising a preamble and a data region, determining that there is insufficient information to decide that the wireless local area network (WLAN) packet is associated with the OBSS based at least in part on the preamble, decoding at least a portion of the data region based at least in part on the determining, identifying an OBSS identification mechanism based at least in part on the decoding, and determining that the WLAN packet is associated with the OBSS based at least in part on the identifying.

A further apparatus for wireless communication is described. The apparatus may include a processor, memory in electronic communication with the processor, and instructions stored in the memory and operable, when executed by the processor, to cause the apparatus to receive a wireless local area network (WLAN) packet comprising a preamble and a data region, determine that there is insufficient information to decide that the wireless local area network (WLAN) packet is associated with the OBSS based at least in part on the preamble, decode at least a portion of the data region based at least in part on the determining, identify an OBSS identification mechanism based at least in part on the decoding, and determine that the WLAN packet is associated with an OBSS based at least in part on the identification.

In some examples of the method, apparatuses, or non-transitory computer-readable medium described herein, the decoding the portion of the data region comprises decoding a media access control (MAC) header within the data region, and determining the WLAN packet is associated with the OBSS is based at least in part on the decoded MAC header. Additionally or alternatively, some examples may include processes, features, means, or instructions for applying a frame check sequence (FCS) to a data unit associated with the MAC header, and decoding the MAC header is based at least in part on the applied FCS.

Some examples of the method, apparatuses, or non-transitory computer-readable medium described herein may further include processes, features, means, or instructions for applying, to the MAC header, a cyclic redundancy check (CRC) in a delimiter field associated with the MAC header, and decoding the MAC header is based at least in part on the applied cyclic redundancy check (CRC). Additionally or alternatively, some examples may include processes, features, means, or instructions for applying, to the MAC header, a cyclic redundancy check (CRC) in a service field associated with the WLAN packet, and decoding the MAC header is based at least in part on the applied CRC. Some examples of the method, apparatuses, or non-transitory computer-readable medium described herein may further include processes, features, means, or instructions for applying, to the delimiter signature field, a cyclic redundancy check (CRC) in a delimiter field associated with the MAC header, and decoding the decode the delimiter signature field based at least in part on the applied CRC.

Some examples of the method, apparatuses, or non-transitory computer-readable medium described herein may further include processes, features, means, or instructions for identifying the MAC header is based at least in part on identifying a first bit pattern associated with a first field and a second bit pattern associated with a second field that are both associated with the MAC header. Additionally or alternatively, in some examples the first field is a frame control field, and wherein the second field is a duration field.

In some examples of the method, apparatuses, or non-transitory computer-readable medium described herein, the decoding comprises identifying, in the data region, an indication that the WLAN packet is associated with the OBSS, and determining that the WLAN packet is associated with the OBSS based at least in part on the indication. Some examples of the method, apparatuses, or non-transitory computer-readable medium described herein, may further include processes, features, means or instructions for identifying a BSS identifier in a service field associated with the WLAN packet.

In some examples of the method, apparatuses, or non-transitory computer-readable medium described herein, may further include processes, features, means, or instructions for decoding the portion of the data region comprises decoding a media access control (MAC) header within the data region, and determining the WLAN packet is associated with the OBSS is based at least in part on the decoded medium access control (MAC) header.

In some examples of the method, apparatuses, or non-transitory computer-readable medium described herein, the identifying the indication comprises identifying that the identifier for the BSS matches an OBSS identifier in a list of OBSS identifiers at the wireless device. Additionally or alternatively, in some examples the OBSS identification mechanism comprises a frame check sequence (FCS) associated with the data region, a cylic redundancy check (CRC) in a delimiter field associated with the data region, a CRC in a service field associated with the data region, or a combination thereof.

In some examples of the method, apparatuses, or non-transitory computer-readable medium described herein, the OBSS identification mechanism comprises a frame check sequence (FCS) associated with the data region. Additionally or alternatively, in some examples the OBSS identification mechanism comprises a cylic redundancy check (CRC) in a delimiter field associated with the data region.

In some examples of the method, apparatuses, or non-transitory computer-readable medium described herein, the OBSS identification mechanism comprises a CRC in a service field associated with the data region. Additionally or alternatively, in some examples the identifying the indication comprises identifying a BSS identifier in a delimiter signature field associated with a MAC header.

Some examples of the method, apparatuses, or non-transitory computer-readable medium described herein may further include processes, features, means, or instructions for comparing a received signal strength of the WLAN packet with a threshold when it is determined the WLAN packet is associated with the OBSS.

Some examples of the method, apparatuses, or non-transitory computer-readable medium described herein may further include processes, features, means, or instructions for discarding at least one of a physical protocol data unit (PPDU) duration, a transmit opportunity (TXOP) duration, a network allocation vector (NAV) information, or any combination thereof based at least in part on the comparison.

A method of wireless communication is described. The method may include generating a wireless local area network (WLAN) packet comprising a preamble, a data region, and an identification mechanism associated with the OBSS, inserting the identification mechanism into a portion of the data region associated with the WLAN packet, and transmitting the WLAN packet over a channel that is shared with an overlapping basic service set (OBSS).

A further apparatus for wireless communication is described. The apparatus may include a processor, memory in electronic communication with the processor, and instructions stored in the memory and operable, when executed by the processor, to cause the apparatus to generate a wireless local area network (WLAN) packet comprising a preamble, a data region, and an identification mechanism associated with the OBSS, insert the identification mechanism into a portion of the data region associated with the WLAN packet, and transmit the WLAN packet over a channel that is shared with the OBSS.

In some examples of the method, apparatuses, or non-transitory computer-readable medium described herein, the inserting comprises inserting a cyclic redundancy check (CRC) to decode a MAC header into a delimiter field associated with a MAC header of the portion of the data region. Additionally or alternatively, in some examples the inserting comprises inserting a cyclic redundancy check (CRC) to decode a MAC header into a service field associated with the portion of the data region of the WLAN packet.

In some examples of the method, apparatuses, or non-transitory computer-readable medium described herein, the inserting comprises inserting a BSS identifier into the service field associated with the WLAN packet.

Some examples of the methods, apparatuses, or non-transitory computer-readable media described herein may further include processes, features, means, or instructions for identifying an OBSS packet. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
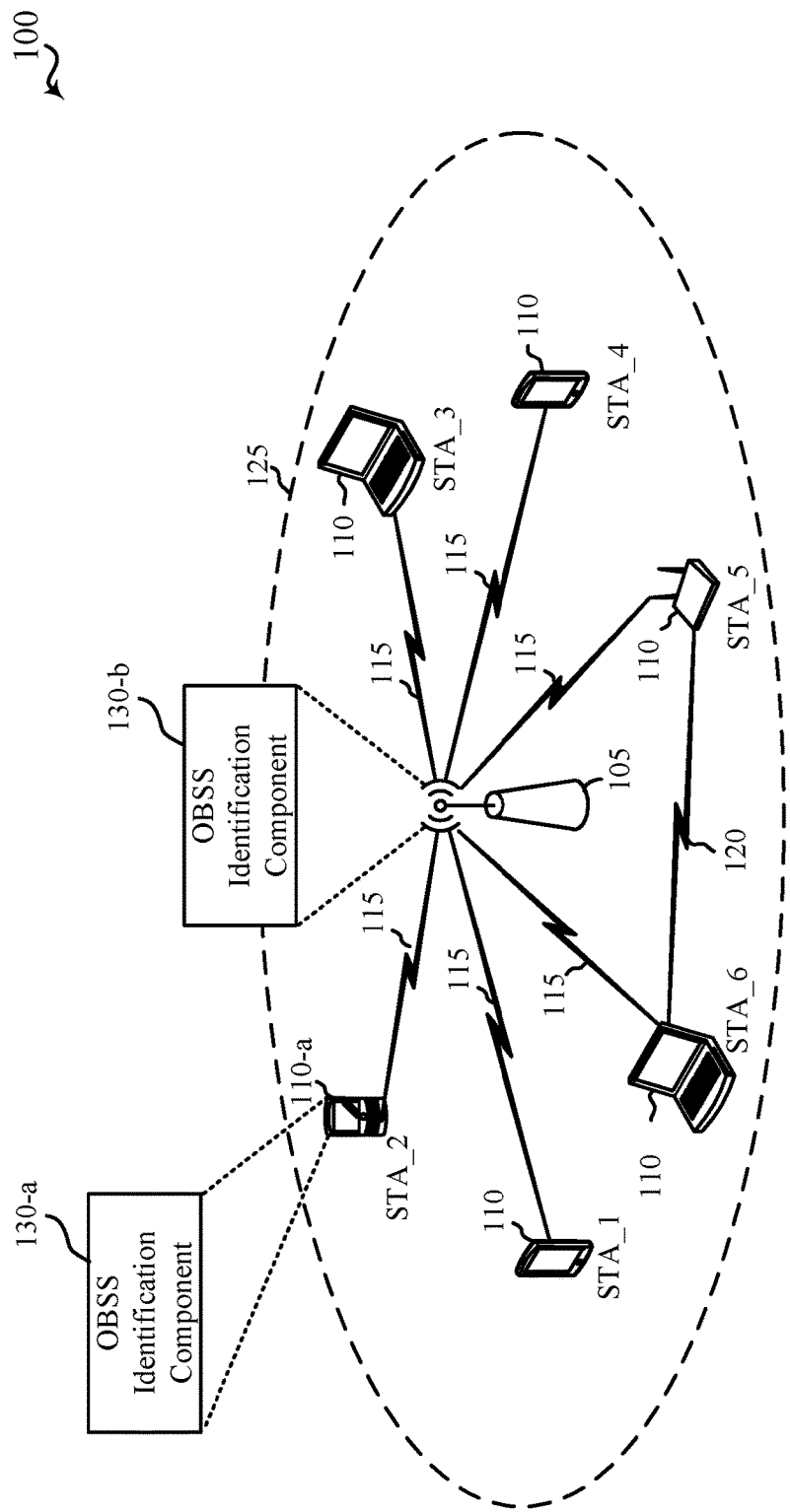
FIG. 1 illustrates a wireless local area network (WLAN) that supports identifying an OBSS packet in accordance with various aspects of the present disclosure.

According to the present disclosure, a wireless device may utilize enhanced overlapping basic service set (OBSS) identification techniques to determine whether an interfering packet is associated with an OBSS (i.e., an OBSS packet). Aspects of the disclosure are described in the context of a wireless communication system. For example, wireless devices, such as APs and STAs, may communicate in a wireless network that utilizes a shared spectrum. An AP and the associated STAs may be referred to as a basic service set (BSS), and in some cases, a wireless network may include multiple BSSs with overlapping coverage areas. Packets transmitted within a first BSS may be detected by wireless devices operating in a second BSS. In some cases, the wireless devices in the second BSS may determine that the interference from the first BSS (i.e., an OBSS packet) is significantly low (e.g., detected energy levels are below a clear channel assessment (CCA) threshold) and may concurrently transmit within the second BSS using common resources as the OBSS transmission. As a result, a network may increase resource utilization and network throughput. In some cases, if a wireless device incorrectly identifies a detected packet as an OBSS packet and concurrently transmits with the in-BSS packet, network throughput may be degraded. Accordingly, enhanced STAs and/or APs may use OBSS identification mechanisms to differentiate between in-BSS packets and OBSS packets.

In an example, a wireless device may determine there is sufficient information in the preamble of the packet to determine it is OBSS, and may then drop the packet along with any associated duration fields. In some examples, after determining there is insufficient information to identify a detected WLAN packet as an OBSS packet from an associated preamble, a wireless device may use a data region within the WLAN packet for additional information. For instance, the wireless device may decode a media access control (MAC) header, which may include information such as the BSS identifier (e.g., BSSID) associated with the transmission to verify whether the detected packet is associated with an OBSS. In some cases, the MAC header may include multiple address fields, such as a transmit address field, a receive address field, and another address field that carries the AP address, or the BSS identifier. In some cases, a basic service set-ID (BSSID) may be used by the wireless device to determine whether the WLAN packet is an OBSS packet. The wireless device may further perform reliability checks (e.g., cyclic redundancy checks (CRC)) to verify that the MAC header has been correctly decoded before utilizing the MAC header information. In some cases, the wireless device may use a frame check sequence (FCS) that may be located at the end of a MAC protocol data unit (MPDU) to confirm the MAC header has been successfully received (e.g., the information embedded in the MAC header has not corrupted). In further cases, the wireless device may identify a bit pattern in the MAC header that may be indicative of an accurate MAC header. In some cases, a CRC for the MAC header may be included in an MPDU delimiter field and utilized by the wireless device to reliably decode the MAC header. In further cases, a CRC for the MAC header is included in a service field associated with the WLAN packet and is utilized by the wireless device to reliably decode the MAC header.

In some examples, OBSS identification measures may be included in the WLAN packet. In one case, a BSS identifier, such as a color, which may be a shortened/reduced BSS identifier, may be included in a service field and may be used by the wireless device to identify the BSS associated with the WLAN packet. In some cases, a BSS identifier may be included in a delimiter signature field and may be used by the wireless device to identify the BSS associated with the WLAN packet. In further cases, a wireless device may be provided a list of BSS identifiers (e.g., BSSIDs) for neighboring OBSSs and may determine a packet as an OBSS packet if a received BSS identifier (e.g., a color, BSSID, etc.) matches one of a BSS identifiers (e.g., BSSID) associated with one of the OBSSs on the list. These and other aspects of the disclosure are further illustrated by and described with reference to apparatus diagrams, system diagrams, and flowcharts.

FIG. 1 illustrates a wireless local area network (WLAN) 100 (also known as a wireless fidelity (Wi-Fi) network) that supports identifying an OBSS packet in accordance with various aspects of the present disclosure. The WLAN network 100 may include an AP 105 and multiple associated STAs 110, such as STA_1 through STA_6, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 110 may represent a BSS or an extended service set (ESS). The various STAs 110 in the network are able to communicate with one another through the AP 105. Additionally shown is a coverage area 125 of the AP 105, which may represent a basic service area (BSA) of the WLAN network 100. An extended network station (not shown) associated with the WLAN network 100 may be coupled with a wired or wireless distribution system (DS) that may allow multiple APs 105 to be connected in an ESS.

Although not shown in FIG. 1, a STA 110 may be located in the intersection of more than one coverage area 125 and may associate with more than one AP 105. A single AP 105 and an associated set of STAs 110 may be referred to as a BSS. An ESS is a set of connected BSSs. ADS may be used to connect APs 105 in an ESS. In some cases, the coverage area 125 of an AP 105 may be divided into sectors. The WLAN network 100 may include APs 105 of different types (e.g., metropolitan area, home network, etc.), with varying and overlapping coverage areas 125. Two STAs 110 may, additionally or alternatively, communicate directly via a direct wireless link 120 regardless of whether both STAs 110 are in the same coverage area 125. Examples of direct wireless links 120 may include, but is not limited to, Wi-Fi Direct connections, Wi-Fi Tunneled Direct Link Setup (TDLS) links, and other group connections. STAs 110 and APs 105 may communicate according to the WLAN radio and baseband protocol for physical (PHY) and medium access control (MAC) layers. In other implementations, peer-to-peer connections or ad hoc networks may be implemented within WLAN network 100.

When coverage areas associated with multiple BSSs overlap with one another, the BSSs may be referred to as overlapping BSSs (OBSSs). In these instances, a STA 110 may communicate with an AP 105 while in the presence of interfering transmissions from other OBSSs. In some cases, the STA 110 may detect interfering transmissions (e.g., during a CCA) from an OBSS. STA 110 may then identify whether the interfering transmission is associated with an OBSS. If the interfering transmission is not associated with an OBSS (e.g., transmission from other wireless device in the current BSS), STA 110 may observe collision-based back off durations (e.g., a back-off duration, contention window, deferral period, etc.). In other cases, after identifying the interfering transmission is associated with an OBSS, the STA 110 may compare a received signal strength indication (RSSI) of the interfering transmission with a CCA threshold value. If the RSSI is above the threshold, STA 110 may refrain from transmitting in accordance with a collision-based protocol. Alternatively, if the RSSI is below a threshold, STA 110 may conduct transmissions to AP 105 concurrently with the interfering transmission. As a result, OBSSs may reuse communication resources and increase throughput at the network. An interfering transmission may include a WLAN packet, which may include a preamble and a data region. In some cases, a STA 110 may fail to determine whether an interfering packet is associated with an OBSS via the preamble.

Therefore, a wireless device, such as an AP 105 or a STA 110, may utilize enhanced OBSS identification techniques, which may be implemented in OBSS identification component 130, to determine whether an interfering packet is associated with an OBSS. In an example, STA 110-a may receive a WLAN packet that includes a preamble and a data region. STA 110-a may analyze the preamble to determine whether the WLAN packet is an OBSS packet. In one case, STA 110-a may determine that the WLAN packet is an OBSS packet based at least in part on a color associated with the preamble. For example, STA 110-a may receive a WLAN packet and a portion of the packet may include an identifier field (e.g., BSS identifier (color), BSSID), the STA 110-a may then compare the identifier field of the received WLAN packet to a list of BSS identifiers for at least one neighboring OBSS. Based on the comparison, STA 110-a may determine that the WLAN packet is an OBSS packet. For instance, STA 110-a may identify that the identifier field of the received WLAN packet matches a BSS identifier (i.e., color) for a neighboring OBSS. Alternatively, if STA 110-a determines that there may be insufficient information (e.g., BSS identifier, BSSID) in the preamble to identify the WLAN packet as an OBSS packet, STA 110-a may decode a portion of the data region, such as a MAC header, to determine if the WLAN packet is an OBSS packet. For instance, by identifying a BSS identifier in the MAC header. In some cases, prior to using the information in the MAC header, STA 110-a may confirm the MAC header has been received reliably (e.g., via an FCS, CRC, etc.).

Additionally or alternatively, a wireless device, such as an AP 105 or a STA 110, may include a BSS identifier (e.g., color) in portions of the data region, such as a service field or an MPDU delimiter. A receiving device may identify the BSS identifier in the data region and determine a WLAN packet is associated with an OBSS. The wireless device may, additionally or alternatively, be provided with a list of OBSSs and may cross-reference a received BSS identifier with the list. The enhanced OBSS techniques may provide a wireless device redundant measures to determine if a received WLAN packet is associated with an OBSS, and may further provide mechanisms for the wireless device to make the determination with reduced latency and increased reliability. In some cases, the enhanced OBSS techniques may be performed alone, or in combination with other OBSS techniques.

Figure 2:
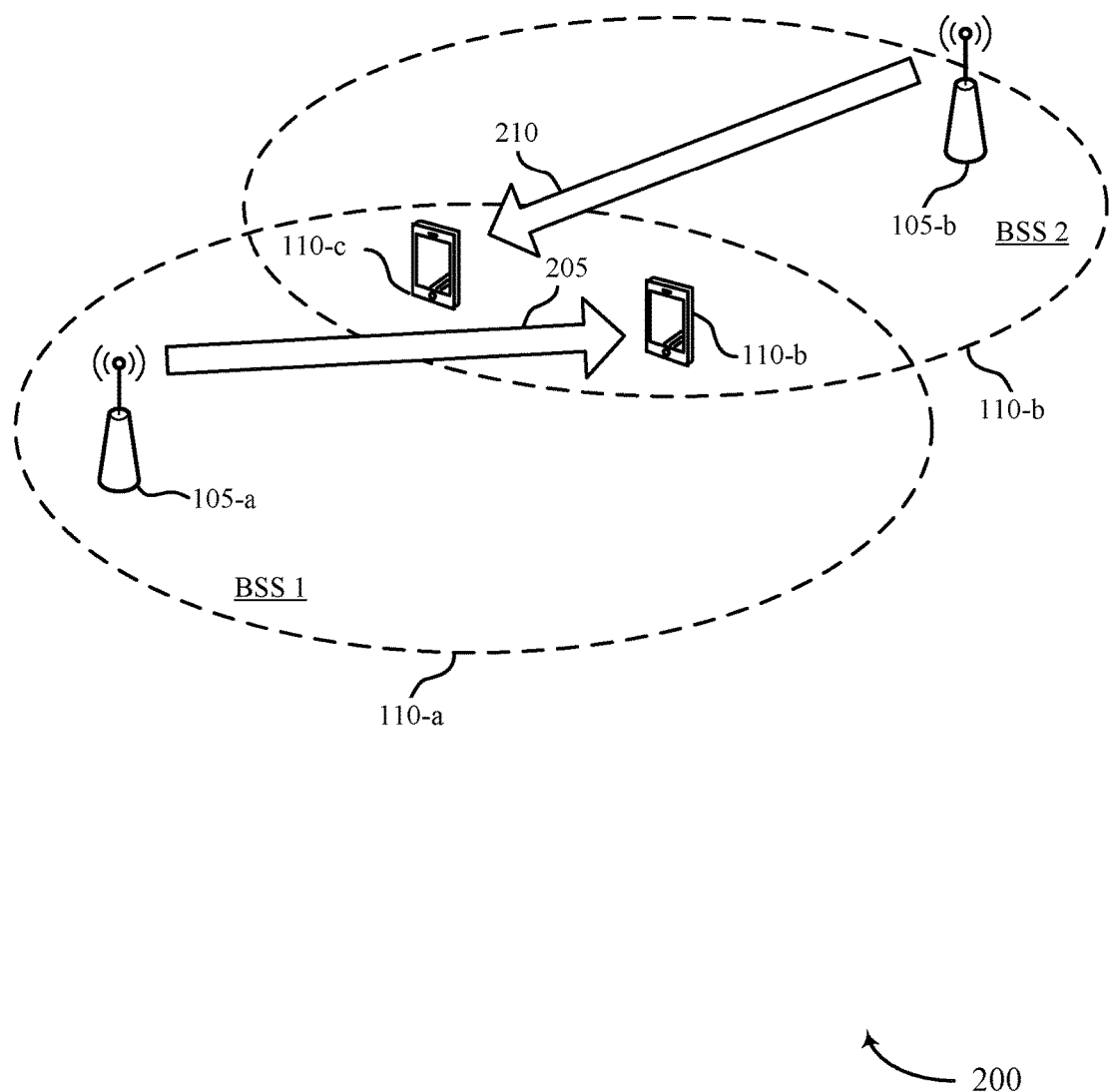
FIG. 2 illustrates an example of a wireless communications subsystem that supports identifying an OBSS packet in accordance with various aspects of the present disclosure.

FIG. 2 illustrates an example of a wireless communications subsystem 200 that supports identifying an OBSS packet in accordance with various aspects of the present disclosure. Wireless communications subsystem 200 may include STA 110-b, STA 110-c, AP 105-a, and AP 105-b, which may be examples of a STA 110 or an AP 105 and may communicate with one another as described above with reference to FIG. 1. In an example, AP 105-a and STA 110-b may be associated with a first BSS, BSS_1, while AP 105-b and STA 110-c may be associated with a second BSS, BSS_2.

In an example, STA 110-b may detect interfering communications from BSS_2 (e.g., transmissions between AP 105-b to STA 110-c). In some cases, STA 110-b detects the interfering communication during a CCA. STA 110-b may decode a preamble associated with the interfering communication and determine whether the interfering communication is associated with a different BSS (e.g., BSS_2). In some cases, the interfering communication may be a WLAN packet that includes a preamble and a data region. In some cases, if STA 110-b fails to determine the WLAN packet is an OBSS packet (i.e., associated with a different BSS, such as BSS_2, that is different than the current BSS, such as BSS_1) in the preamble, the STA 110-b may be prevented from reusing the frequency resources associated with the detected WLAN packet. For instance, network control signaling may be sent to STA 110-b indicating that frequency reuse is allowed only in cases where the preamble includes an OBSS indication. In other cases, network control signaling may be sent to STA 110-b indicating that frequency reuse is allowed in cases where a STA identifies a WLAN packet is an OBSS packet in a data region of the WLAN packet. For instance, after failing to determine the WLAN packet is an OBSS packet from the preamble, STA 110-b may then analyze the data region and decode at least a portion of the data region, e.g., a MAC header to determine if the WLAN packet is an OBSS packet. In some cases, the MAC header may include information such as the BSS identifier associated with the WLAN packet. STA 110-b may, additionally or alternatively, perform measures to determine whether the MAC header has been decoded reliably. As a result, STA 110-b may confirm the information in the MAC header is accurate and verify whether the WLAN packet is an OBSS packet. In an example, STA 110-b may utilize a FCS to determine if the MAC header has been reliably received. An FCS may include a 32-bit CRC check for an MPDU including the MAC header.

In some cases, prior to transmitting the WLAN packet, AP 105-b may include OBSS identification mechanisms in the WLAN packet, which may provide STA 110-b a mechanism to expedite identifying whether the WLAN packet is associated with an OBSS by decreasing the time used to determine whether a MAC header has been reliably received. For instance, an AP 105-b may include a data corruption check in the WLAN packet. In an example, AP 105-b may include a CRC to decode a MAC header in a delimiter field that is associated with the MAC header. STA 110-b may apply the CRC to the MAC header to determine if the MAC header has been reliably received. STA 110-b may decode the MAC header to determine whether the WLAN packet is associated with a different BSS (e.g., identifying a BSSID in an address field, etc.) after determining the MAC header has been successfully received. If the WLAN packet is an OBSS packet, STA 110-*b* may compare a measured RSSI of the WLAN packet with a threshold. If the RSSI is below the threshold and STA 110-*b* may reliably tell the WLAN packet is an OBSS packet, STA 110-*b* may discard collision-avoidance parameters associated with the OBSS packet such as an identified PPDU duration, a TXOP duration, and/or NAV information. In some cases, the PPDU duration and the TXOP duration may be identified in the preamble associated with the WLAN packet, while the NAV information may be identified in a MAC header. The PPDU duration, TXOP duration, and the NAV information may indicate a length in time during which other WLAN devices may refrain from transmissions before attempting to access the medium. In some cases, by discarding the collision avoidance information, STA 110-*b* may simultaneously transmit with the OBSS packet and reuse the occupied frequency resources.

In an example, AP 105-*b* may include a CRC to decode the MAC header in a service field associated with the WLAN packet. In some cases, AP 105-*b* may include a BSS identifier (e.g., a color, BSSID, etc.) in the service field associated with the WLAN packet or the delimiter field associated a MAC header. STA 110-*b* may identify the included BSS identifier and determine that AP 105-*b* is associated with an OBSS (i.e., BSS_2). In an example, STA 110-*b* may be provided with a list of OBSSs and may determine AP 105-*b* is associated with an OBSS if the BSSID or color matches an entry in the OBSS list. In some examples, STA 110-*b* may use, additional or alternative, means to identify a MAC header has been reliably received. For instance, STA 110-*b* may identify a first bit pattern for a MAC header's frame control field (e.g., the first two bits are bit value '0') and a second bit pattern for a MAC header's duration field (e.g., the last two bits are bit value '0') to determine the MAC header has been successfully received.

Figure 3:
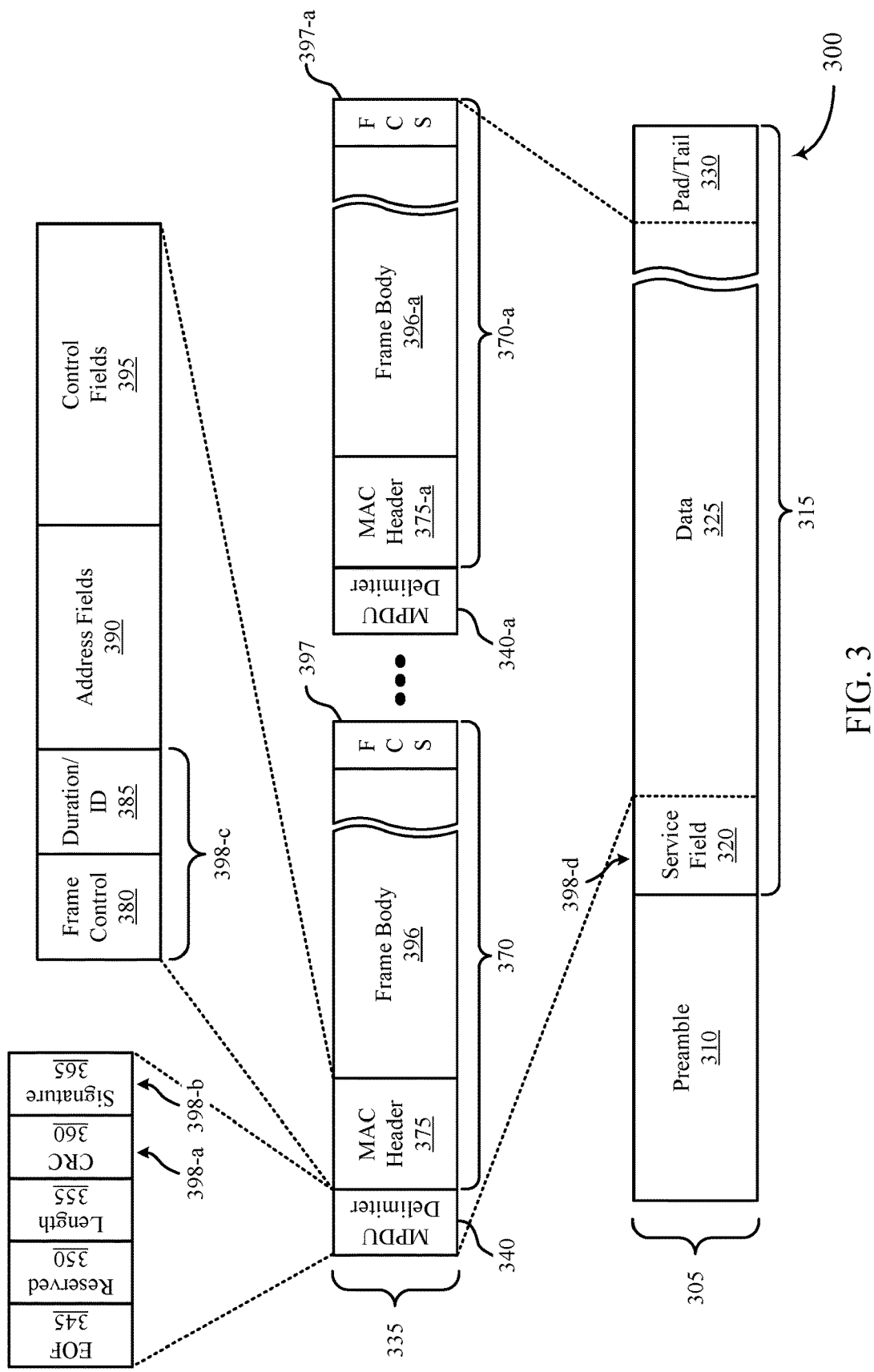
FIG. 3 illustrates an example of a WLAN packet structure 300 for identifying an OBSS packet in accordance with various aspects of the present disclosure.

FIG. 3 illustrates an example of a WLAN packet structure 300 for identifying an OBSS packet in accordance with various aspects of the present disclosure. WLAN packet structure 300 may illustrate aspects of a transmission between a STA 110 and an AP 105, as described above with reference to FIGS. 1-2.

In an example, WLAN packet structure 300 may include a physical (PHY) protocol data unit (PPDU) 305, which may include a PHY preamble 310 and a data region 315. Data region 315 may include a service field 320, data field 325, and a padding/tail region 330. The PHY preamble 310 may include short training fields (STFs), such as legacy STF (L-STF), high throughput STF (HT-STF), very high throughput STF (VHT-STF), and the like. The PHY preamble 310 may, additionally or alternatively, include long training fields (LTFs) such as, L-LTF, HT-LTF, VHT-LTF, and the like. The PHY preamble 310 may, additionally or alternatively, include signal (SIG) fields, such as L-SIG, HT-SIG, VHT-SIG-A, VHT-SIG-B, and the like. The PHY preamble 310 may be used by a wireless device for packet detection and/or automatic gain control (AGC) (e.g., using an STF), channel estimation (e.g., using an LTF), to indicate the duration of a packet (e.g., using a SIG field), and the like. The PHY preamble 310 may further be constructed to maintain compatibility between standard devices (e.g., legacy devices) and enhanced devices (e.g., very high throughput (VHT) capable devices). In some cases, the PHY preamble 310 may include a BSS identifier of an AP 105, that may be or include at least one of the OBSS identification mechanisms. In further cases, the BSS identifier in the PHY preamble 310 may include a BSS identifier, such as a BSSID, of the AP 105. For example, a BSSID may be a color or an AP address in a PHY preamble of a WLAN packet, the color or AP address may, but is not limited to, associate the WLAN packet with an AP (e.g., AP 105). In some cases, as mentioned above with respect to FIG. 2, a WLAN device may fail to receive (e.g., an identifier is not included) or successfully decode (e.g., due to interference) an identifier in a PHY preamble 310.

Data region 315 may include a service field 320, data field 325, and padding/tail region 330. Service field 320 may include a set of bits for scrambler initialization/synchronization and an additional set of bits which may be reserved or otherwise occupied. Data field 325 may, additionally or alternatively, be referred to as a protocol service data unit (PSDU) and may include a single data unit 370, which may, additionally or alternatively, be referred to as an MPDU 370, or multiple data units (MPDU) 335, which may, additionally or alternatively, referred to as an aggregate MPDU (A-MPDU) 335. An A-MPDU 335 may include MPDU delimiters 340, which may indicate the end of a frame via end of frame (EOF) field 345 and the length of the packet via length field 355; and may include a reserved field, a CRC field 360 for protecting the length field 355, and a signature field 365. In an example, the CRC field 360 may be used to identify that the length field 355 has been improperly decoded and a WLAN device may scan forward to a subsequent MPDU delimiter (e.g., MPDU delimiter 340-*a*). As a result, the WLAN device may decode subsequent MPDUs 370 despite receiving a corrupt MPDU delimiter 340. The signature field 365 may include information such as an American Standard Code for Information Interchange (ASCII) character (e.g., 'N') to aid in software implemented disaggregation.

An MPDU 370 may include a MAC header 375, a frame body 396, and an FCS 397. The MAC header 375 may include a frame control field 380, duration/ID field 385, address fields 390 (e.g., address field 1 through address field 4), control fields 395 (e.g., QoS control field, sequence control field, VHT/HT control field, etc.). The frame control field 380 may include network management information, for instance the frame control field may communicate a protocol version in a protocol version field. In some cases, the protocol version field may be two bits in length and both bits may be set to 0. This may be the case until a fundamental incompatibility exists between standard revisions. The duration/ID field 385 may be 16 bits in length. In some cases, the first 15 bits (e.g., bit 0 to bit 14) may be used to indicate the duration of a following frame transmission, while the last bit (e.g., bit 15) may be left unused (e.g., set to bit value '0'). The address fields 390 may be used to communicate addresses, such as a receive address, a transmit address, or a BSSID. In some cases, the address field assigned to the BSSID may change based at least in part on the configuration of a To DS field and a From DS field. A wireless device that fails to identify a received WLAN packet, such as PPDU 305, as an OBSS packet based at least in part on the PHY preamble 310 may decode the MAC header 375 to determine whether the WLAN packet is associated with an OBSS. For example, in some cases, a wireless device may receive a WLAN packet and determine whether the received WLAN packet is an OBSS packet. The wireless device may perform the determination based at least in part on information in a preamble of the received WLAN packet. The information may include, but is not limited to, a BSSID (e.g., color). The wireless device may then compare the BSSID in the received WLAN packet to its own BSSID, and determine whether a match exists. If no match exits, the received WLAN packet is an OBSS packet. Alternatively, in some cases, the wireless device may receive a WLAN packet that is absent of any identifying information (e.g., BSSID) in its preamble. As a result, the wireless device may perform additional processing of the received WLAN packet, for example, decoding a MAC header (i.e., MAC header 375) to identify an OBSS identification mechanism. In some examples, the decoding at least a portion of the data region (e.g., MAC header, a frame check sequence (FCS) associated with the data region, a cylic redundancy check (CRC) in a delimiter field associated with the data region, a CRC in a service field associated with the data region, or a combination thereof) may include identifying an OBSS identification mechanism in accordance with aspects of the present disclosure.

Frame body 396 may include a single data unit (e.g., an MSDU), which may include user data (e.g., email, VoIP, etc.) and/or internet protocol (IP) information, or, in other cases, may include multiple data units, which may be referred to as an aggregate SDU (A-MSDU). FCS 397 may include a 32-bit CRC which may be calculated over MAC header 375 and frame body 396 to validate the integrity of MPDU 370. In an example, a wireless device, such as an AP 105 or STA 110 as described with respect to FIGS. 1 and 2, that fails to determine whether PPDU 305 is an OBSS packet from the preamble may disable frequency reuse operation. In some examples, a wireless device that fails to determine whether PPDU 305 is an OBSS packet from the preamble 310 may decode a MAC header to determine whether the PPDU 305 is associated with an OBSS. Prior to using the information in the MAC header for deciding whether the packet is OBSS, the wireless device may utilize enhanced OBSS identification mechanisms 398 to ensure the MAC header has been reliably received at the wireless device. Enhanced OBSS identification mechanisms 398 may include, in some cases, the wireless device applying FCS 397 to MPDU 370 to determine if the MAC header 375 was reliably received (e.g., by determining the CRC was conducted successfully). For example, the wireless device may decode a MAC header based at least in part on determining that the preamble 310 does not include a BSS identifier to identify whether a WLAN packet is an OBSS packet. In some cases, the wireless device may decode the MAC header 375 and wait for the FCS 397 before determining if a WLAN packet is an OBSS packet. For example, after determining MAC header 375 was reliably received, the wireless device may analyze the MAC header 375 to identify a BSS identifier. If the identified BSS identifier (i.e., BSSID) does not match the BSS identifier associated with the wireless device, the wireless device may determine the received PPDU 305 is an OBSS packet. For example, a wireless device may compare a list of BSSIDs associated with a number of OBSSs (e.g., for each OBSS in a given geographic area) and the identified BSS identifier in the MAC header (e.g., MAC header 375) to determine whether a WLAN packet is an OBSS packet. In some cases, this comparing may include, but is not limited to, a wireless device cross-referencing an identified BSS identifier (e.g., color) against a BSSIDs in a list, and may determine a WLAN packet is an OBSS packet based on identifying an OBSS identification mechanism (e.g., identifying if the BSS identifier matches any of the known BSSIDs). In other cases, the wireless device may identify an OBSS identification mechanism by comparing the address fields 390 of the decoded MAC header 375 to a BSS identifier of the wireless device. If the address fields 390 do not match the BSS identifier of the wireless device, the PPDU 305 (i.e., WLAN packet) is an OBSS packet. In some cases, the address fields 390 may include a transmit address and a receive address associated with a WLAN packet. In further cases, the wireless device may compare the RSSI associated with the received PPDU 305 against a threshold based on determining that the WLAN packet (i.e., PPDU 305) is an OBSS packet. After determining that PPDU 305 is an OBSS packet and determining the RSSI associated with PPDU 305 is less than a threshold, the wireless device may discard collision-based parameters (e.g., TXOP duration, PPDU duration, NAV information, etc.) associated with the PPDU 305 and perform frequency reuse operation (e.g., concurrent transmissions).

In some examples, the wireless device may apply the enhanced OBSS identification mechanisms 398 to determine MAC header 375 has been reliably decoded with reduced latency. For instance, the wireless device may determine MAC header 375 has been reliably decoded based at least in part on identifying that the first two bits of frame control field 380 and the last two bits of the duration/ID field 385 each have a bit value of '0'. In an example, a wireless device may use CRC field 360 for MAC header 375 as well as for length field 355 to determine whether MAC header 375 has been reliably decoded. In some examples, a wireless device may include a CRC for MAC header 375 in service field 320 to determine whether MAC header 375 has been reliably decoded. In some cases, the wireless device may identify an OBSS identification mechanism by identifying that the service field 320 includes a CRC based at least in part on analyzing the service field. For example, the service field 320 may be unscrambled and the wireless device may analyze bits associated with the service field 320. In one case, if the bits of the unscrambled service field include non-zero bits, the wireless device may determine that the service field 320 includes a CRC for MAC header 375. Additionally, in some cases, a portion of bits in the service field 320 may include a BSS identifier (e.g., color). A wireless device may determine that a WLAN packet (e.g., PPDU 305) is associated with an OBSS based at least in part on the unscrambled bits of the service field 320 including non-zero bits and that the BSS identifier associated with the unscrambled bits does not match a BSS identifier of an OBSS. Additionally or alternatively, the enhanced OBSS identification mechanisms 398 may include a wireless device including a BSS identifier (e.g., a color) in the signature field 365 or service field 320, which a receiving device may use to identify whether PPDU 305 is associated with an OBSS. In some cases, any of the above identification mechanisms may be used either alone or in combination with one another. For instance, a wireless device may determine a WLAN packet is OBSS based at least in part on identifying a BSS identifier and determining a MAC header address is associated with an OBSS.

Figure 4A:
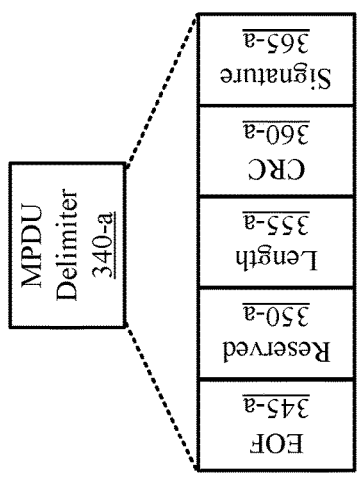
FIGS. 4A and 4B illustrate aspects of a WLAN packet structure 400 for identifying an OBSS packet in accordance with various aspects of the present disclosure.
Figure 4B:
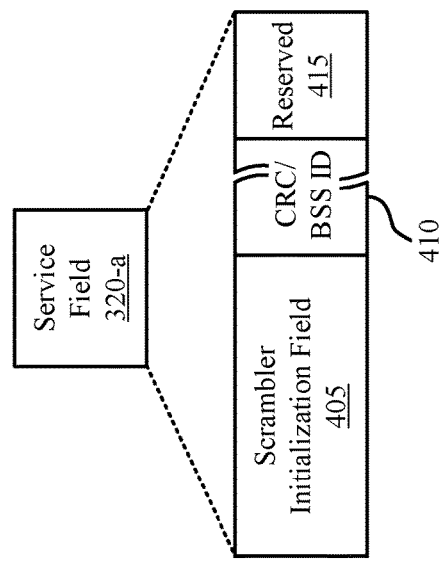

FIGS. 4A and 4B illustrate aspects of a WLAN packet structure 400 for identifying an OBSS packet in accordance with various aspects of the present disclosure. WLAN packet structure 400 may illustrate aspects of a transmission between a STA 110 and an AP 105 and vice versa and may be implemented in WLAN packet structure 300, as described above with reference to FIGS. 1-3. A wireless device, such as a STA 110 or an AP 105, may utilize aspects of the WLAN packet structure 400 to facilitate the identification of the BSS that is associated with a WLAN packet. For instance, the wireless device may utilize and/or provide identification mechanisms to expedite either determining whether a MAC header in the WLAN packet has been reliably decoded and/or identifying the BSS identifier associated with the WLAN packet. After determining the MAC header has been reliably decoded, a wireless device may utilize information in the MAC header which may include a BSSID.

FIG. 4A illustrates aspects of a WLAN packet structure 400-*a* that includes an MPDU delimiter 340-*a*, which may include an EOF field 345-*a*, a reserved field 350-*a*, a length field 355-*a*, a CRC field 360-*a*, and a signature field 365-*a*. In an example, a wireless device may utilize the CRC included in CRC field 360-*a* as a redundancy check for both the length field 355-*a* and a MAC header. Accordingly, a wireless device may identify whether the MAC header has been reliably received at the expiration of the MAC header. This may provide latency benefits over using a redundancy check that occurs later in time, such as an FCS. In some examples, a wireless device may include a BSS identifier (e.g. a color) in signature field 365-*a*. For example, as mentioned above, the enhanced OBSS identification mechanisms 398 may include a wireless device including a BSS identifier (e.g., a color) in the signature field 365, which a receiving device may use to identify whether a WLAN packet is associated with an OBSS. In some cases, a signature field 365-*a* may include a predetermined character (e.g., character 'N') by default. In some cases, a wireless device may identify that signature field 365-*a* does not include the predetermined character (e.g., character 'N'). Additionally, a wireless device may determine that a BSS identifier (e.g., color) in the signature field 365-*a* does not match a BSS identifier associated with an OBSS. For example, a wireless device may compare between a list of BSSIDs of a number of OBSSs (e.g., for each OBSS in a given geographic area) and the BSS identifier in the signature field 365-*a* to determine whether a WLAN packet is an OBSS packet. In further cases, a wireless device may determine that a WLAN packet is an OBSS packet based at least in part on determining that the signature field 365-*a* does not include the predetermined character (e.g., character 'N') and determining that the BSS identifier does not match a BSS identifier associated with an OBSS. In some cases, CRC field 360-*a* may, additionally or alternatively, be used to protect signature field 365-*a*. In some examples, decoding at least a portion a data region of a WLAN packet may include decoding the signature field 365-*a* and identifying a BSS identifier in the signature field 365-*a* may be include identifying an OBSS identification mechanism. For example, the BSS identifier in the signature field 365-*a* may include, but is not limited to, the OBSS identification mechanism. In further cases, a wireless device may be provided a list of BSSID for a number of OBSSs (e.g., for each OBSS in a given geographic area). As a result, a wireless device may cross-reference the received BSS identifier (e.g., a color) against the BSSIDs in the list and may determine a WLAN packet is an OBSS packet if the BSS identifier matches any of the known BSSIDs. This may provide further latency benefits, where a wireless device may determine if the WLAN packet is an OBSS packet at the expiration of MPDU delimiter 340-*a*. Additionally or alternatively, the wireless device may, additionally or alternatively, cross-reference the received BSS identifier from the MAC header with a list of OBSS BSSIDs and if there is a match, decide the packet is an OBSS packet. If a wireless device determines the WLAN packet is an OBSS packet, the wireless device may halt the decoding process and in some cases may discard collision-based parameters. As a result, the wireless device may save power and/or reuse common communication resources.

FIG. 4B illustrates aspects of a WLAN packet structure 400-*b* that includes a service field 320-*a*, which may include a scrambler initialization field 405, a CRC/BSS ID identification field 410, and a reserved field 415. In an example, a wireless device may use the CRC provided in CRC/BSS ID identification field 410 to determine if a subsequent MAC header is reliably received. Accordingly, a wireless device may determine whether a WLAN packet is an OBSS packet at once the MAC header has been decoded and the CRC checked. Accordingly, a wireless device may determine whether a BSS identifier provided in the MAC header is, additionally or alternatively, reliable. In some cases, a wireless device may determine a CRC for the MAC header is included in the service field by identifying that the bits that are not used for scrambler initialization are non-zero. Additionally or alternatively, a wireless device may include a BSS identifier (e.g., a color) in CRC/BSS ID identification field 410, which a wireless device may use to determine whether the WLAN packet is associated with an OBSS. Accordingly, a wireless device may determine whether a WLAN packet is an OBSS packet during service field 320-*a*. In some cases, a wireless device may determine a BSS identifier is included in the service field by identifying that the bits that are not used for scrambler initialization are non-zero. For example, in some cases, the wireless device may identify that the service field 320-*a* includes CRC/BSS ID identification field 410 based at least in part on analyzing the service field 320-*a*. For example, the service field 320-*a* may be unscrambled and the wireless device may analyze bits associated with the service field 320-*a*. In one case, if the bits of the unscrambled service field include non-zero bits, the wireless device may determine that the service field 320-*a* includes a CRC/BSS ID. If a wireless device determines the WLAN packet is an OBSS packet, the wireless device may halt the decoding process and in some cases may discard collision-based parameters. In this way, the wireless device may save power and/or reuse common communication resources. In some examples, determining whether a WLAN packet is an OBSS packet after decoding the MAC header and checking the CRC may include identifying an OBSS identification mechanism (e.g., CRC check) in accordance with aspects of the present disclosure.

Figure 5:
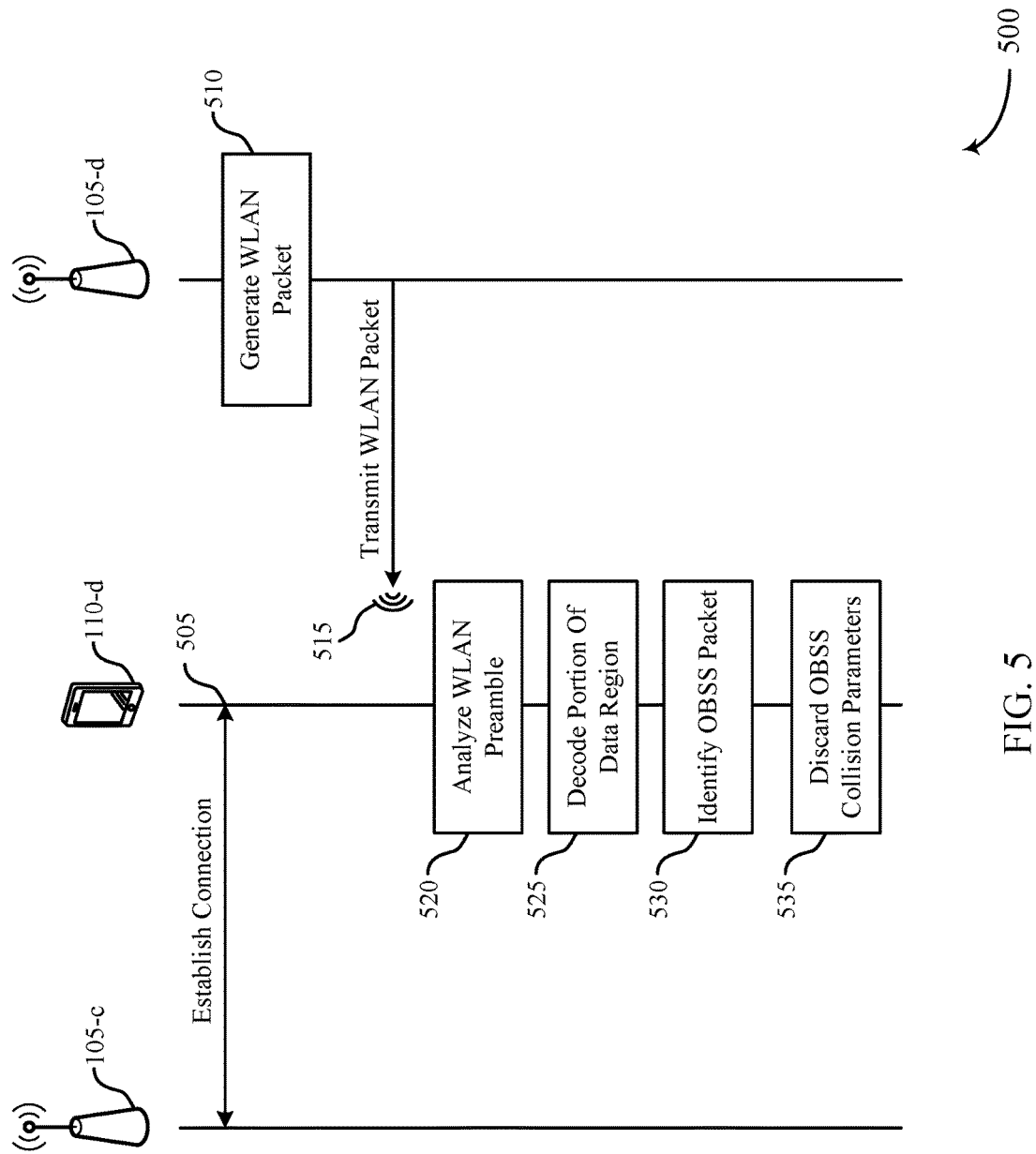
FIG. 5 illustrates an example of a process flow that supports identifying an OBSS packet in accordance with various aspects of the present disclosure.

FIG. 5 illustrates an example of a process flow 500 for identifying an OBSS packet in accordance with various aspects of the present disclosure. Process flow 500 may be performed by STA 110-*b* and AP 105-*b*, which may be an example of a STA 110 and AP 105 described above with reference to FIGS. 1-4. In some examples, a WLAN packet is generated that includes OBSS identification mechanisms in a data region. For instance, AP 105-*d* may generate a WLAN packet with OBSS identification mechanisms and transmit the WLAN packet to another device within a corresponding BSS. STA 110-*d* may be associated with a different BSS and may detect and analyze the WLAN packet. STA 110-*d* may then identify whether the detected WLAN packet is an OBSS or an in-BSS packet.

At step 505, STA 110-*d* may establish a connection with AP 105-*c*. In some cases, establishing a connection with AP 105-*c* may include associating with and/or connecting to AP 105-*c*. In some cases STA 110-*d* may be associated with multiple APs, for instance STA 110-*d* may, additionally or alternatively, be associated with but not coupled with AP 105-*d*. In some cases, AP 105-*c* may indicate to STA 110-*d* protocols for reusing a shared spectrum. For instance, AP 105-*c* may direct STA 110-*d* to reuse frequency spectrum only in cases where the WLAN preamble includes OBSS information. In some cases, if the WLAN preamble does not include OBSS information (e.g., BSS identifier), AP 105-*c* may direct STA 110-*d* to decode a data region to determine if the WLAN packet is an OBSS packet prior to reusing frequency spectrum. In an example, STA 110-*d* may be directed to determine a MAC header has been reliably decode based on an FCS, while other examples, STA 110-*d* may be directed to expedite determining whether a MAC has been reliably decoded using enhanced OBSS identification techniques.

At step 510, AP 105-*d* may generate a WLAN packet that includes a preamble, a data region, and an identification mechanism (e.g., a data corruption check in a WLAN packet) associated with the BSS. Generating the WLAN packet may include inserting the identification mechanism into one or both of a service field associated with the WLAN packet and/or a delimiter field associated with a MAC header, as for example, described with reference to FIGS. 1-4. In an example, AP 105-*d* may insert a CRC for decoding a MAC header into a delimiter field associated with the MAC header. The CRC may act as a protectionary measure that enables STA 110-*d* to determine whether the MAC header has been properly decoded. In some examples, AP 105-*d* insert a CRC for decoding a MAC header in a service field associated with the WLAN packet. In some cases, AP 105-*d* inserts a BSS identifier, such as a color, into the service field. In other cases, AP 105-*d* inserts a BSS identifier into the delimiter signature field associated with a MAC header. In some cases, AP 105-*d* protects the BSS identifier by using a CRC in the delimiter to protect the information in the delimiter signature field.

At step 515, AP 105-*d* may transmit the WLAN packet over a channel that is shared with an OBSS, such as AP 105-*d* and the associated STAs 110. The transmission may be detected at STA 110-*d*.

At step 520, STA 110-*d* analyzes the WLAN preamble associated with the detected WLAN packet to determine whether the WLAN packet is from an OBSS or from another device within the current BSS. In some cases, the WLAN packet does not include OBSS identification measures, while in other cases STA 110-*d* fails to successfully decode the WLAN preamble. If the preamble does contain OBSS identification information, the STA 110-*d* may move to step 530.

At step 525, STA 110-*d* may decode a portion of the data region based at least in part on determining there is insufficient information to decide that the WLAN packet is associated with an overlapping BSS. In some cases, the decoded data portion may correspond to a MAC header within the data region as described with reference to FIGS. 1-4. Decoding the MAC header may include applying an FCS to the data unit associated with the MAC header. In some cases, decoding the MAC header may include applying a CRC in a delimiter to the MAC header. In other cases, decoding the MAC header may include applying a CRC in a service field to the MAC header. The FCS and CRC mechanisms may enable STA 110-*d* to determine whether a MAC header has been reliably received. In some examples, STA 110-*d* may identify the MAC header has been reliably received based at least in part on identifying a first bit pattern (e.g., first two bits are bit value '0') associated with a first field (e.g., a bit pattern in a frame control field) and a second bit pattern (e.g., last two bits are bit value '0') in a second field (e.g., a duration field) that are both associated with the MAC header.

At step 530, STA 110-*d* may identify whether a packet is an OBSS packet or an in-BSS packet. In an example, after determining whether the MAC header has been reliably received, STA 110-*d* may use the information embedded in the MAC to determine whether a detected WLAN packet is in-BSS or OBSS. In some examples, STA 110-*d* may identify an indication that the WLAN packet is associated with OBSS. For instance, STA 110-*d* may identify a BSS identifier, such as a color, in a service field associated with the WLAN packet. In some examples, STA 110-*d* may identify a BSS identifier, in a delimiter signature associated with a MAC header. In some cases, STA 110-*d* may apply a CRC that is received in a delimiter field to the delimiter signature field to determine that the BSS identifier in the delimiter signature field was reliably received. In some cases, STA 110-*d* may, additionally or alternatively, be provided a list of OBSS identifiers. If STA 110-*d* receives a BSS identifier, such as a color or BSSID, and identifies that the received identifier matches an OBSS identifier in the provided list, STA 110-*d* may determine that an OBSS packet has been received. In some cases, any of the above OBSS identification techniques may be used alone or in combination with one another to reliably decode a packet and/or identify a packet type.

At step 535, STA 110-*d* may compare the RSSI associated with the detected WLAN packet against a predetermined CCA threshold. If the RSSI is below a threshold, STA 110-*d* may stop decoding the packet, and discard the collision-avoidance parameters associated with the WLAN packet, such as a PPDU duration, a TXOP duration, a NAV, etc. The collision-avoidance parameters may direct a WLAN device, such as STA 110-*d*, to refrain from accessing/transmitting over the medium for a pre-determined duration of time. By dropping the collision avoidance parameters, STA 110-*d* may begin concurrent transmissions with AP 105-*d* using common resources (i.e., reuse the common resources). In some cases, aspects of the above-mentioned process flow may be performed in a different order or omitted from the process. In other examples, an AP, such as AP 105-*c* and/or AP 105-*d*, may similarly perform OBSS identification measures as described above.

Figure 6:
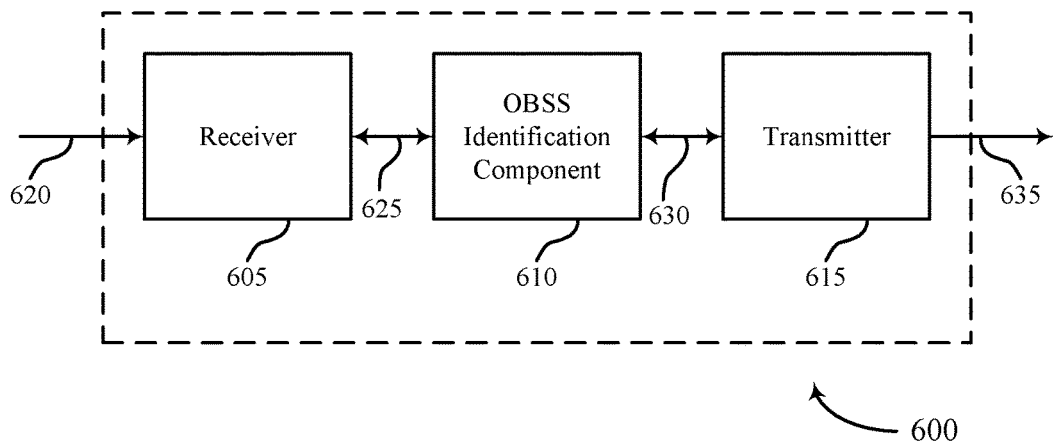
FIGS. 6-8 show block diagrams of a wireless device that supports identifying an OBSS packet in accordance with various aspects of the present disclosure.

FIG. 6 shows a block diagram of a wireless device 600 configured for determining a packet is associated with an overlapping basic service set in accordance with various aspects of the present disclosure. Wireless device 600 may be an example of aspects of a wireless device, such as an AP 105 or a STA 110, described with reference to FIGS. 1-5. Wireless device 600 may include a receiver 605, an OBSS identification component 610, or a transmitter 615. Wireless device 600 may, additionally or alternatively, include a processor. Each of these components may be in communication with each other.

The receiver 605 may receive information such as packets, user data, or control information associated with various information channels (e.g., control channels, data channels, and information related to determining a packet is associated with an overlapping basic service set, etc.) via communication link 420. Information received at the receiver 605 may be passed on to the OBSS identification component 610 via communication link 425, and to other components of wireless device 600. In some examples, the receiver 605 may receive a WLAN packet comprising a preamble and a data region.

The OBSS identification component 610 may receive a WLAN packet comprising a preamble and a data region, analyze the received preamble and determine that there is insufficient information to decide that the WLAN packet is associated with an OBSS, decode at least a portion of the data region based at least in part on the analyzing, and determine that the WLAN packet is associated with an OBSS based at least in part on the decoding. In one example, components, for example as shown in FIGS. 1-5, OBSS identification component 610 may include a circuit or circuitry for accomplishing each of these functions.

The transmitter 615 may transmit signals received from other components of wireless device 600 via communication link 630. The transmitter may transmit signals via communication link 635. In some examples, the transmitter 615 may be collocated with the receiver 605 in a transceiver component. The transmitter 615 may include a single antenna, or it may include a plurality of antennas. In some examples, the transmitter 615 may transmit the WLAN packet over a channel that is shared with an OBSS. In some cases, the transmitter 615 may transmit an indication to decode the at least a portion of the data region based at least in part on determining there is insufficient information in the received preamble. In some cases, the transmitter 615 may transmit an indication to prevent discarding collision-based parameters based at least in part on determining there is insufficient information in the received preamble.

Figure 7:
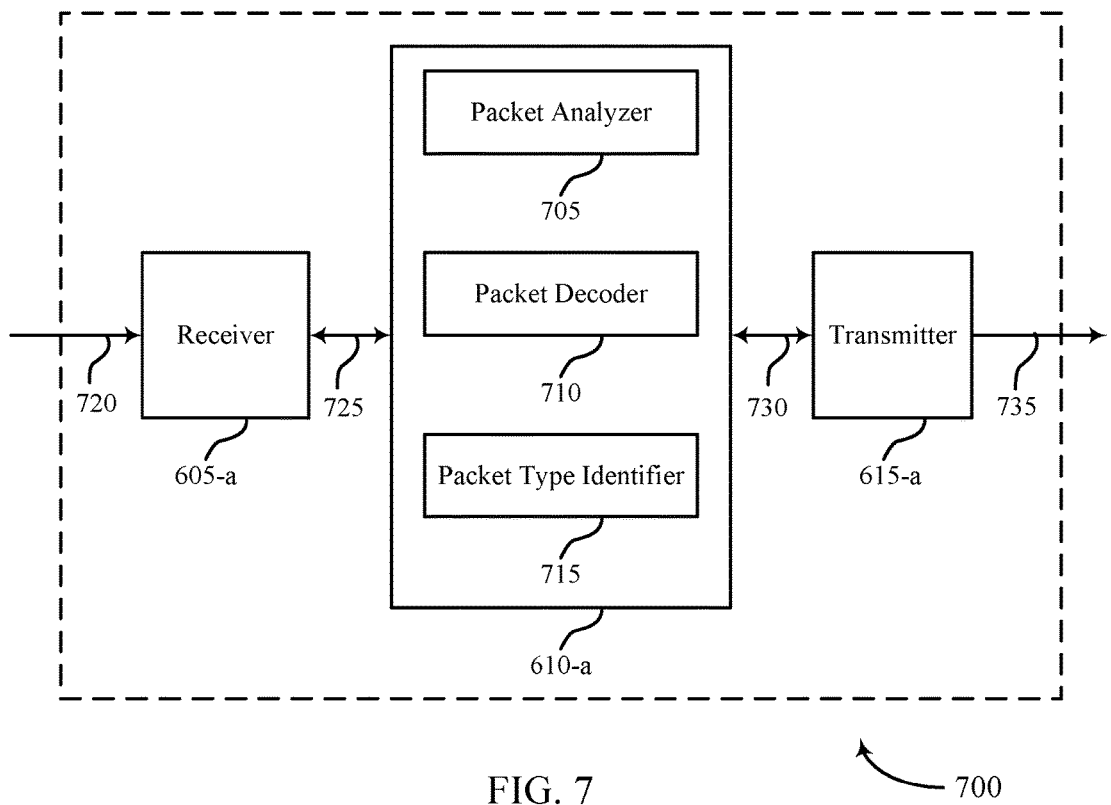

FIG. 7 shows a block diagram of a wireless device 700 for determining a packet is associated with an overlapping basic service set in accordance with various aspects of the present disclosure. Wireless device 700 may be an example of aspects of a wireless device 600, a STA 110, or an AP 105 described with reference to FIGS. 1-6. Wireless device 700 may include a receiver 605-*a*, an OBSS identification component 610-*a*, or a transmitter 615-*a*. Wireless device 700 may, additionally or alternatively, include a processor. Each of these components may be in communication with each other. The OBSS identification component 610-*a* may, additionally or alternatively, include a packet analyzer 705, a packet decoder 710, and a packet type identifier 715.

The receiver 605-*a* may receive information via communication link 720 which may be passed on to OBSS identification component 610-*a* via communication link 725, and to other components of wireless device 700. The OBSS identification component 610-*a* may perform the operations described with reference to FIG. 6. The transmitter 615-*a* may transmit signals received from other components of wireless device 700 via communication link 730. The transmitter 615-*a* may transmit signal via communication link 735.

The packet analyzer 705 may analyze the received preamble and determine that there is insufficient information to decide that the WLAN packet is associated with an OBSS as described with reference to FIGS. 2-5. In one embodiment, components, for example as shown in FIGS. 1-5, packet analyzer 705 may include a circuit or circuitry for accomplishing each of these functions.

The packet decoder 710 may decode at least a portion of the data region based at least in part on the analyzing as described with reference to FIGS. 2-5. In some examples, the decoding the portion of the data region comprises decoding a MAC header within the data region. The packet decoder 710 may, additionally or alternatively, determine the WLAN packet is associated with the OBSS based at least in part on the decoded MAC header. The packet decoder 710 may, additionally or alternatively, apply a FCS to a data unit associated with the MAC header and decode the MAC header based at least in part on the applied FCS. The packet decoder 710 may, additionally or alternatively, apply, to the MAC header, a CRC in a delimiter field associated with the MAC header and/or a service field associated with the WLAN packet. The packet decoder 710 may decode the MAC header based at least in part on the applied CRCs. The packet decoder 710 may, additionally or alternatively, identify the MAC header based at least in part on identifying a first bit pattern associated with a first field and a second bit pattern associated with a second field that are both associated with the MAC header. In some examples, the first field may be a frame control field and the second field may be a duration field. In some examples, the decoding comprises identifying, in the data region, an indication that the WLAN packet may be associated with the OBSS. In some examples, identifying the indication comprises identifying a BSS identifier in a service field associated with the WLAN packet. The packet decoder 710 may, additionally or alternatively, apply, to the delimiter signature field, a CRC in a delimiter field associated with the MAC header. The packet decoder 710 may, additionally or alternatively, decode the delimiter signature field based at least in part on the applied CRC. In one embodiment, components, for example as shown in FIGS. 1-5, packet decoder 710 may include a circuit or circuitry for accomplishing each of these functions.

The packet type identifier 715 may determine that the WLAN packet is associated with an OBSS based at least in part on the decoding as described with reference to FIGS. 2-5. The packet type identifier 715 may, additionally or alternatively, determine that the WLAN packet is associated with the OBSS based at least in part on the indication. In some examples, the identifying the indication comprises identifying that the identifier for the BSS matches an OBSS identifier in a list of OBSS identifiers at the wireless device. In some examples, the identifying the indication comprises identifying a BSS identifier in a delimiter signature field associated with a MAC header. The packet type identifier 715 may, additionally or alternatively, insert the identification mechanism into at least one of a service field associated with the WLAN packet, a delimiter field associated with a MAC header, or a combination thereof. In some examples, the inserting comprises inserting a CRC to decode a MAC header into the delimiter field associated with the MAC header. In some examples, the inserting comprises inserting a CRC to decode a MAC header into the service field associated with the WLAN packet. In some examples, the inserting comprises inserting a BSS identifier into the service field associated with the WLAN packet. In some examples, the inserting comprises inserting a BSS identifier in the delimiter signature field associated with a MAC header. In one embodiment, components, for example as shown in FIGS. 1-5, packet type identifier 715 may include a circuit or circuitry for accomplishing each of these functions.

Figure 8:
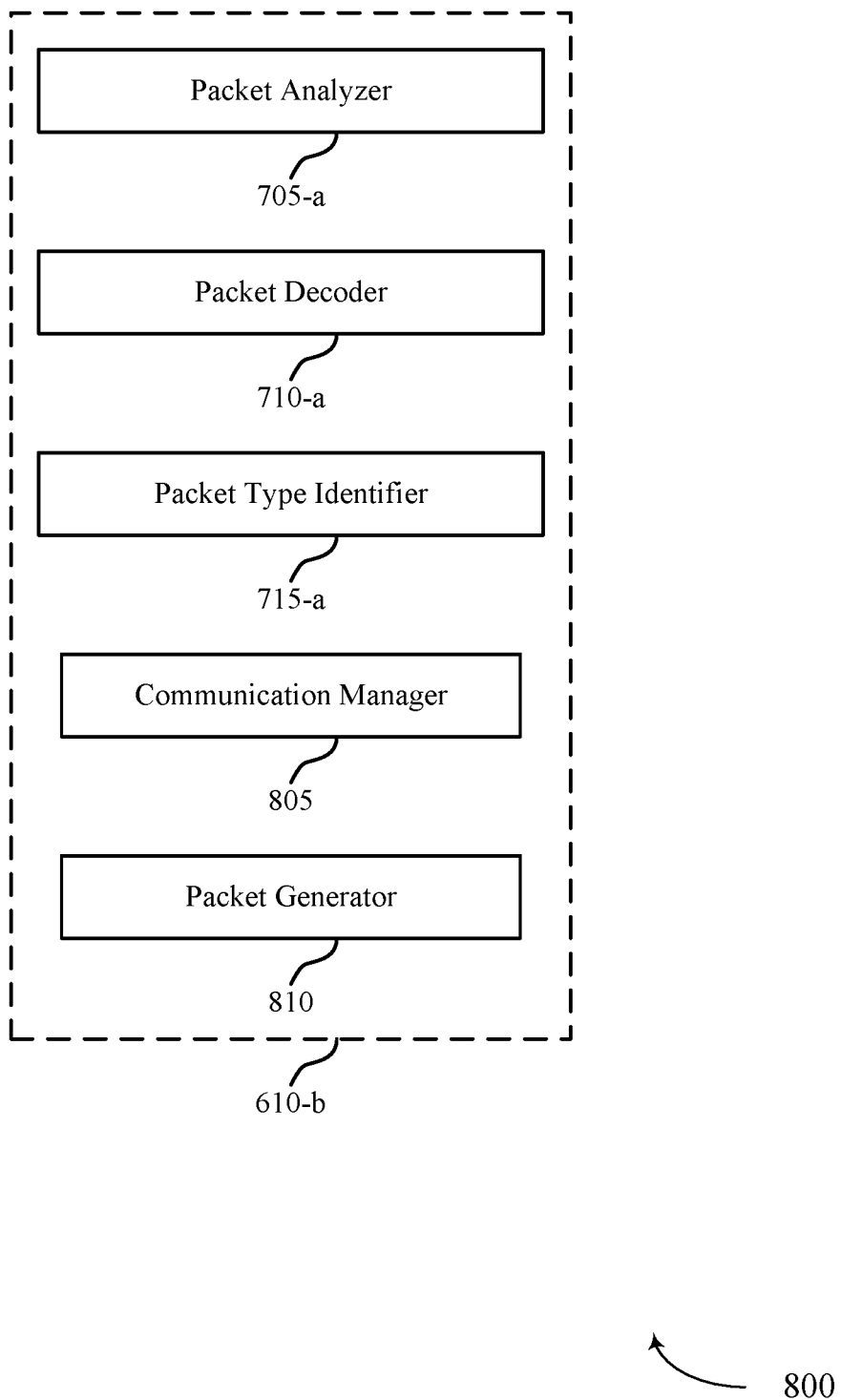

FIG. 8 shows a block diagram 800 of an OBSS identification component 610-*b* which may be a component of a wireless device 600 or a wireless device 700 for determining a packet is associated with an overlapping basic service set in accordance with various aspects of the present disclosure. The OBSS identification component 610-*b* may be an example of aspects of an OBSS identification component 610 described with reference to FIGS. 6-7. The OBSS identification component 610-*b* may include a packet analyzer 705-*a*, a packet decoder 710-*a*, and a packet type identifier 715-*a*. Each of these components may perform the functions described with reference to FIG. 7. The OBSS identification component 610-*b* may, additionally or alternatively, include a communication manager 805, and a packet generator 810.

The communication manager 805 may compare a received signal strength of the WLAN packet with a threshold when it is determined the WLAN packet is associated with the OBSS as described with reference to FIGS. 2-5. The communication manager 805 may, additionally or alternatively, discard at least one of a physical protocol data unit (PPDU) duration, a transmit opportunity (TXOP) duration, a network allocation vector (NAV) information, or any combination thereof based at least in part on the comparison. In one embodiment, components, for example as shown in FIGS. 1-5, communication manager 805 may include a circuit or circuitry for accomplishing each of these functions.

The packet generator 810 may generate a WLAN packet comprising a preamble, a data region, and an identification mechanism associated with the BSS as described with reference to FIGS. 2-5. In one example, components, for example as shown in FIGS. 1-5, packet generator 810 may include a circuit or circuitry for accomplishing each of these functions.

In one example, components, for example as shown in FIGS. 1-5, communication manager 805 or packet generator 810, may include a circuit or circuitry for accomplishing each of these functions.

Figure 9:
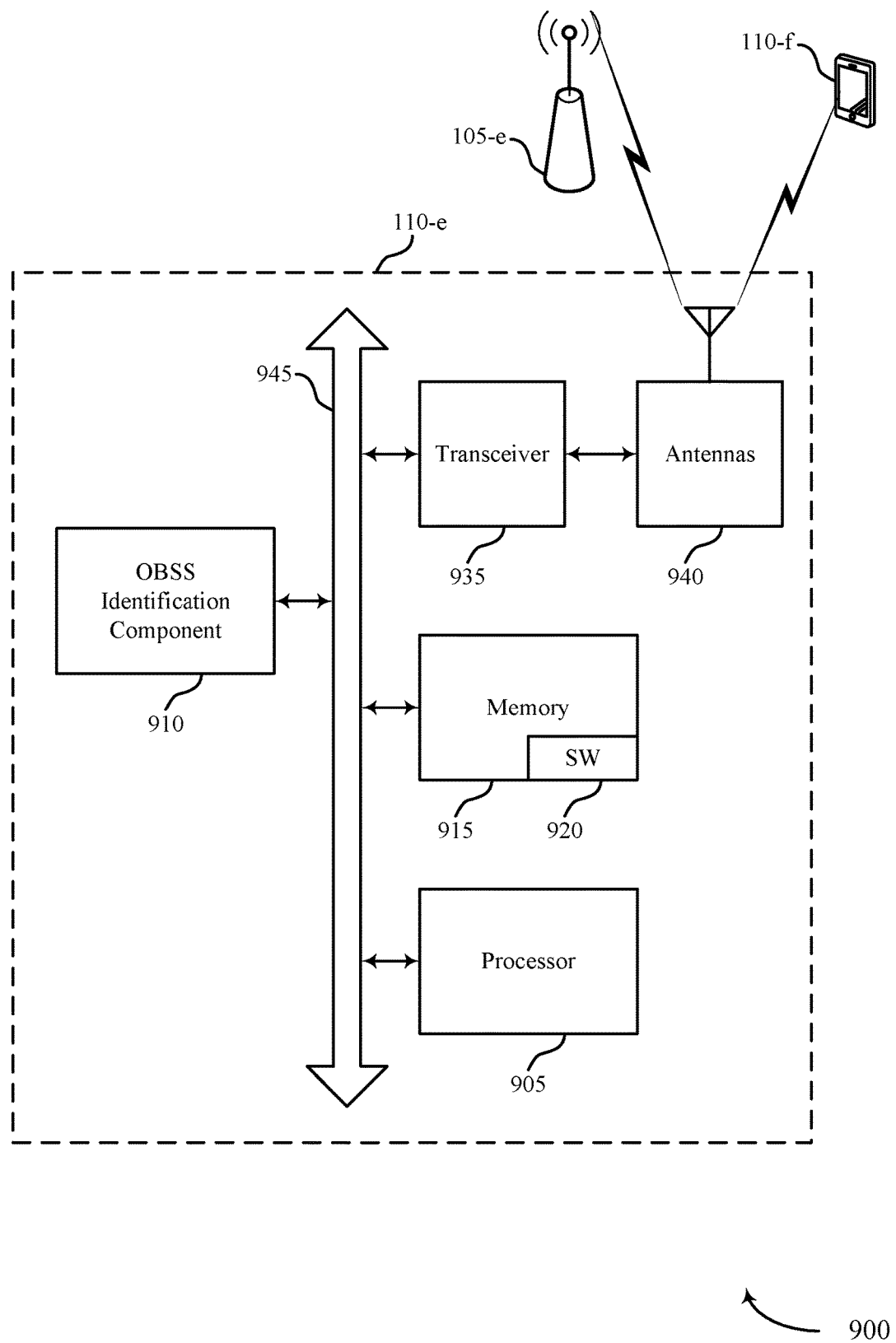
FIG. 9 illustrates a block diagram of a system including a wireless device that supports identifying an OBSS packet in accordance with various aspects of the present disclosure.

FIG. 9 shows a diagram of a system 900 including a STA 110-e configured for determining a packet is associated with an overlapping basic service set in accordance with various aspects of the present disclosure. System 900 may include STA 110-e, which may be an example of a wireless device 600, a wireless device 700, a STA 110, or an AP 105 described with reference to FIGS. 1, 2 and 6-8. STA 110-e may include an OBSS identification component 910, which may be an example of an OBSS identification component 610 described with reference to FIGS. 6-8. STA 110-e may, additionally or alternatively, include components for bi-directional voice and data communications including components for transmitting communications and components for receiving communications. For example, STA 110-e may communicate bi-directionally with STA 110-f or AP 105-e.

STA 110-e may, additionally or alternatively, include a processor 905, and memory 915 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with an AP 105 or another STA 110. The transceiver 935 may include a modem to modulate the packets and provide the modulated packets to the antenna(s) 940 for transmission, and to demodulate packets received from the antenna(s) 940. While STA 110-e may include a single antenna 940, STA 110-e may, additionally or alternatively, have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., determining a packet is associated with an overlapping basic service set, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

Figure 10:
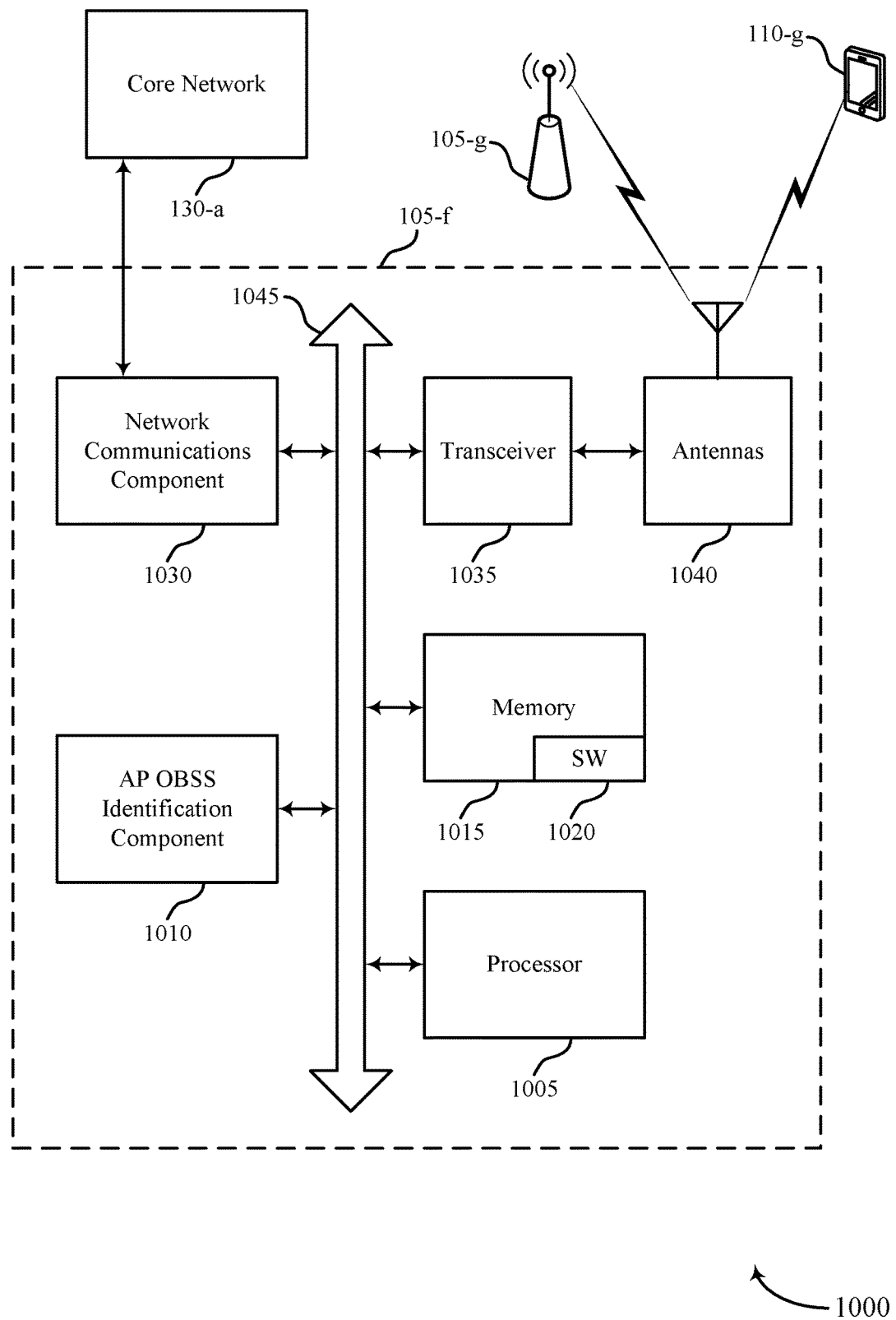
FIG. 10 illustrates a block diagram of a system including a base station that supports identifying an OBSS packet in accordance with various aspects of the present disclosure.

FIG. 10 shows a diagram of a system 1000 including an AP 105 configured for determining a packet is associated with an overlapping basic service set in accordance with various aspects of the present disclosure. System 1000 may include AP 105-f, which may be an example of a wireless device 600, a wireless device 700, or an AP 105 described with reference to FIGS. 1, 2 and 7-9. AP 105-f may include an AP OBSS identification component 1010, which may be an example of an AP OBSS identification component 1010 described with reference to FIGS. 7-9. AP 105-f may, additionally or alternatively, include components for bi-directional voice and data communications including components for transmitting communications and components for receiving communications. For example, AP 105-g may communicate bi-directionally with AP 105-g or STA 110-g.

The AP 105-f may include a processor 1005, memory 1015 (including software (SW)1020), transceiver 1035, and antenna(s) 1040, which each may be in communication, directly or indirectly, with one another (e.g., over bus system 1045). The transceiver 1030 may be configured to communicate bi-directionally, via the antenna(s) 1040, with the STAs 110, which may be multi-mode devices. The transceiver 1035 (or other components of the AP 105-f) may, additionally or alternatively, be configured to communicate bi-directionally, via the antennas 1040, with one or more other APs (not shown). The transceiver 1035 may include a modem configured to modulate the packets and provide the modulated packets to the antennas 1040 for transmission, and to demodulate packets received from the antennas 1040. The AP 105-f may include multiple transceivers 1035, each with one or more associated antennas 1040. The transceiver may be an example of a combined receiver 605 and transmitter 615 of FIG. 6.

The memory 1015 may include RAM and ROM. The memory 1015 may, additionally or alternatively, store computer-readable, computer-executable software code 1020 containing instructions that are configured to, when executed, cause the processor 1005 to perform various functions described herein (e.g., determining a packet is associated with an overlapping basic service set, selecting coverage enhancement techniques, call processing, database management, message routing, etc.). Alternatively, the software 1020 may not be directly executable by the processor 1005 but be configured to cause the computer, e.g., when compiled and executed, to perform functions described herein. The processor 1005 may include an intelligent hardware device, e.g., a CPU, a microcontroller, an ASIC, etc. The processor 1005 may include various special purpose processors such as encoders, queue processing components, base band processors, radio head controllers, digital signal processor (DSPs), and the like.

The AP communications component 1025 may manage communications with other APs 105. In some cases, a communications management component may include a controller or scheduler for controlling communications with STAs 110 in cooperation with other APs 105. For example, the AP communications component 1025 may coordinate scheduling for transmissions to STAs 110 for various interference mitigation techniques such as beamforming or joint transmission.

The components of wireless device 600, wireless device 700, and OBSS identification component 610 may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may, additionally or alternatively, be implemented, in whole or in part, with instructions embodied in a memory, formatted to be executed by one or more general or application-specific processors.

Figure 11:
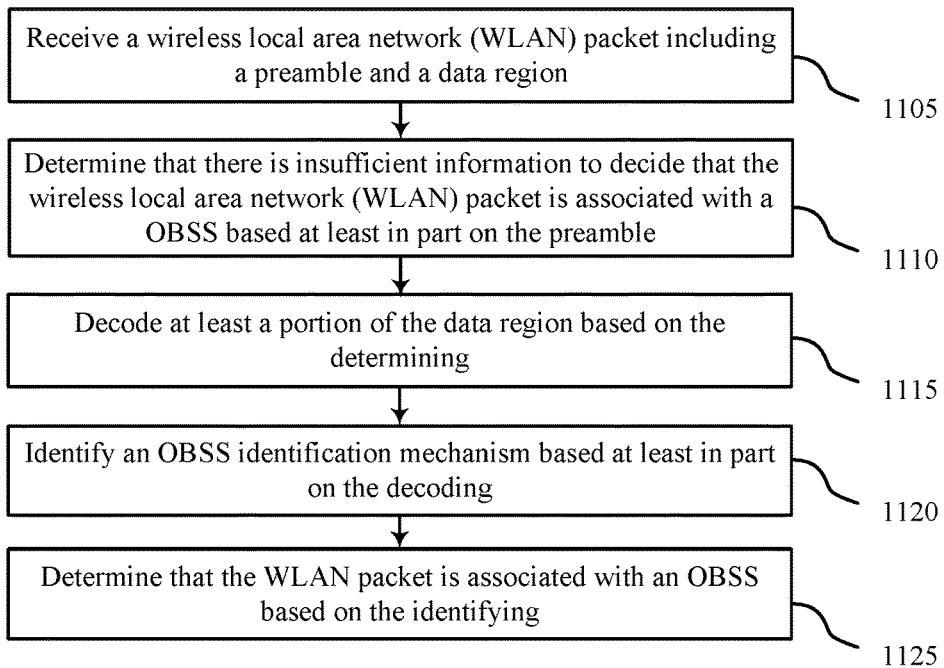
FIGS. 11-15 illustrate methods for identifying an OBSS packet in accordance with various aspects of the present disclosure.

FIG. 11 shows a flowchart illustrating a method 1100 for determining a packet is associated with an overlapping basic service set in accordance with various aspects of the present disclosure. The operations of method 1100 may be implemented by a wireless device, such as an AP 105 or a STA 110, or its components as described with reference to FIGS. 1-10. For example, the operations of method 1100 may be performed by the OBSS identification component 610 as described with reference to FIGS. 6-9. In some examples, an AP 105 or a STA 110 may execute a set of codes to control the functional elements of the wireless device, such as an AP 105 or a STA 110, to perform the functions described below. Additionally or alternatively, the wireless device, such as an AP 105 or a STA 110, may perform aspects the functions described below using special-purpose hardware.

At block 1105, the wireless device, such as an AP 105 or a STA 110, may receive a WLAN packet comprising a preamble and a data region as described with reference to FIGS. 2-5. In some examples, the operations of block 1105 may be performed by the receiver 605 as described with reference to FIG. 6.

At block 1110, the wireless device, such as an AP 105 or a STA 110, may determine that there is insufficient information to decide that the WLAN packet is associated with an OBSS based at least in part on the preamble as described with reference to FIGS. 2-5. In some examples, the operations of block 1110 may be performed by the packet analyzer 705 as described with reference to FIG. 7.

At block 1115, the wireless device, such as an AP 105 or a STA 110, may decode at least a portion of the data region based at least in part on the determining as described with reference to FIGS. 2-5. In some examples, the operations of block 1115 may be performed by the packet decoder 710 as described with reference to FIG. 7. At block 1120, the wireless device, such as an AP 105 or a STA 110, may identify an OBSS identification mechanism based at least in part on the decoding as described with reference to FIGS. 2-5. In some examples, the operations of block 1115 may be performed by the packet decoder 710 as described with reference to FIG. 7.

At block 1125, the wireless device, such as an AP 105 or a STA 110, may determine that the WLAN packet is associated with an OBSS based at least in part on the decoding as described with reference to FIGS. 2-5. In some examples, the operations of block 1120 may be performed by the packet type identifier 715 as described with reference to FIG. 7.

Figure 12:
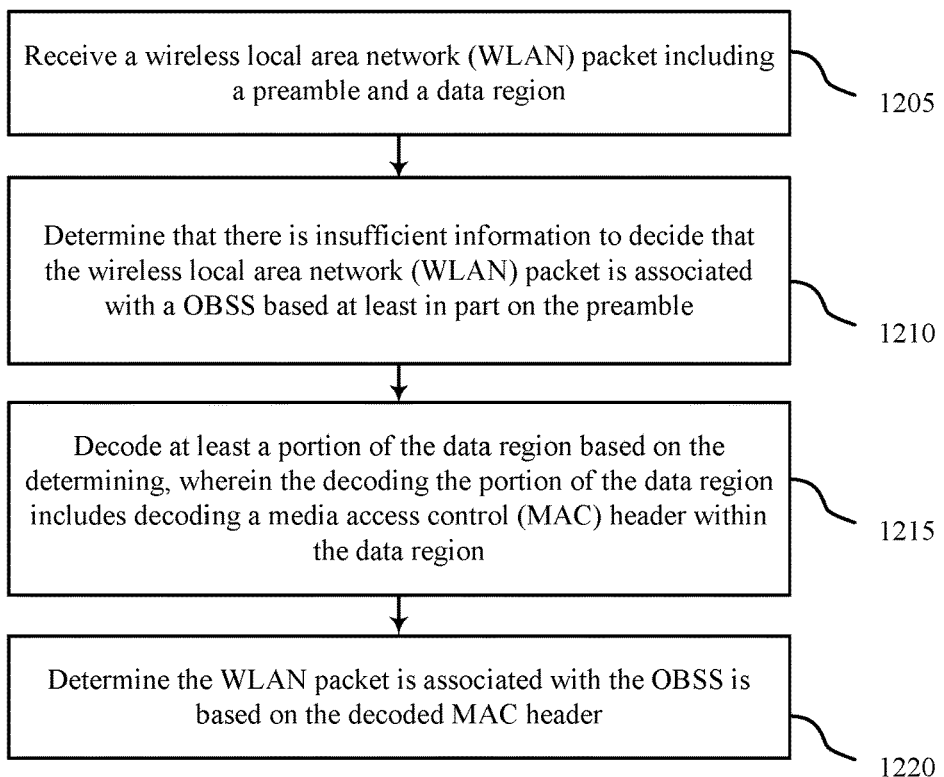

FIG. 12 shows a flowchart illustrating a method 1200 for determining a packet is associated with an overlapping basic service set in accordance with various aspects of the present disclosure. The operations of method 1200 may be implemented by a wireless device, such as an AP 105 or a STA 110, or its components as described with reference to FIGS. 1-10. For example, the operations of method 1200 may be performed by the OBSS identification component 610 as described with reference to FIGS. 6-9. In some examples, an AP 105 or a STA 110 may execute a set of codes to control the functional elements of the wireless device, such as an AP 105 or a STA 110, to perform the functions described below. Additionally or alternatively, the wireless device, such as an AP 105 or a STA 110, may perform aspects the functions described below using special-purpose hardware. The method 1200 may, additionally or alternatively, incorporate aspects of method 1100 of FIG. 11.

At block 1205, the wireless device, such as an AP 105 or a STA 110, may receive a WLAN packet comprising a preamble and a data region as described with reference to FIGS. 2-5. In some examples, the operations of block 1205 may be performed by the receiver 605 as described with reference to FIG. 6.

At block 1210, the wireless device, such as an AP 105 or a STA 110, may determine that there is insufficient information to decide that the WLAN packet is associated with an OBSS based at least in part on the preamble as described with reference to FIGS. 2-5. In some examples, the operations of block 1210 may be performed by the packet analyzer 705 as described with reference to FIG. 7.

At block 1215, the wireless device, such as an AP 105 or a STA 110, may decode at least a portion of the data region based at least in part on the determining as described with reference to FIGS. 2-5. In some cases, the decoding the portion of the data region comprises decoding a MAC header within the data region. In some examples, the operations of block 1215 may be performed by the packet decoder 710 as described with reference to FIG. 7.

At block 1220, the wireless device, such as an AP 105 or a STA 110, may determine the WLAN packet is associated with the OBSS based at least in part on the decoded MAC header as described with reference to FIGS. 2-5. In some examples, the operations of block 1220 may be performed by the packet type identifier 715 as described with reference to FIG. 7.

Figure 13:
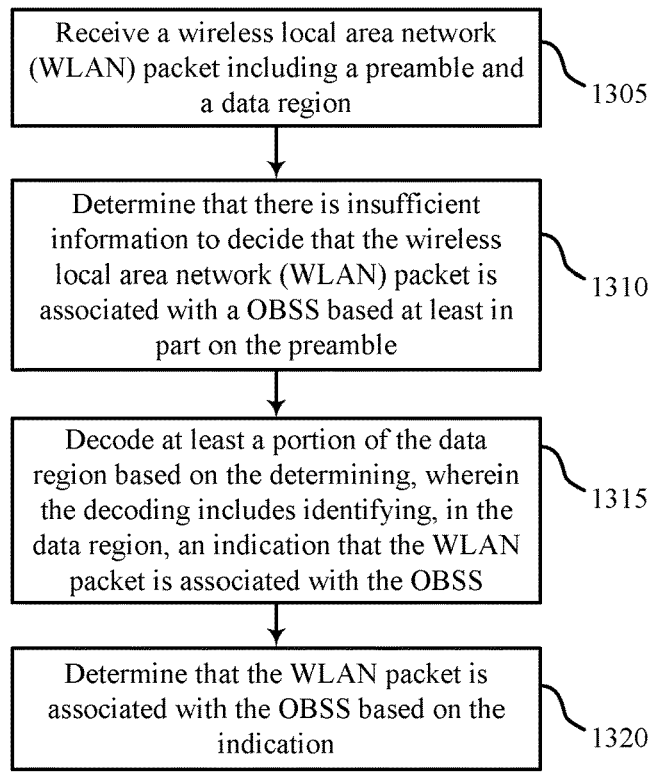

FIG. 13 shows a flowchart illustrating a method 1300 for determining a packet is associated with an overlapping basic service set in accordance with various aspects of the present disclosure. The operations of method 1300 may be implemented by a wireless device, such as an AP 105 or a STA 110, or its components as described with reference to FIGS. 1-10. For example, the operations of method 1300 may be performed by the OBSS identification component 610 as described with reference to FIGS. 6-9. In some examples, an AP 105 or a STA 110 may execute a set of codes to control the functional elements of the wireless device, such as an AP 105 or a STA 110, to perform the functions described below. Additionally or alternatively, the wireless device, such as an AP 105 or a STA 110, may perform aspects the functions described below using special-purpose hardware. The method 1300 may, additionally or alternatively, incorporate aspects of methods 1100, and 1200 of FIGS. 11-12.

At block 1305, the wireless device, such as an AP 105 or a STA 110, may receive a WLAN packet comprising a preamble and a data region as described with reference to FIGS. 2-5. In some examples, the operations of block 1305 may be performed by the receiver 605 as described with reference to FIG. 6.

At block 1310, the wireless device, such as an AP 105 or a STA 110, may determine that there is insufficient information to decide that the WLAN packet is associated with an OBSS based at least in part on the preamble as described with reference to FIGS. 2-5. In some examples, the operations of block 1310 may be performed by the packet analyzer 705 as described with reference to FIG. 7.

At block 1315, the wireless device, such as an AP 105 or a STA 110, may decode at least a portion of the data region based at least in part on the determining as described with reference to FIGS. 2-5. In some cases, the decoding comprises identifying, in the data region, an indication (e.g., OBSS identification mechanism) that the WLAN packet is associated with the OBSS. In some examples, the operations of block 1315 may be performed by the packet decoder 710 as described with reference to FIG. 7.

At block 1320, the wireless device may determine that the WLAN packet is associated with the OBSS based at least in part on the indication as described with reference to FIGS. 2-5. In some examples, the operations of block 1320 may be performed by the packet type identifier 715 as described with reference to FIG. 7.

Figure 14:
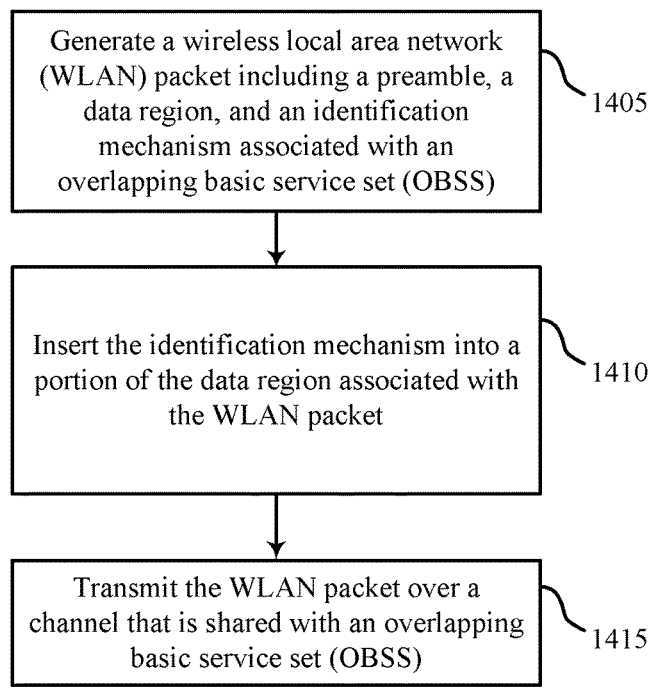

FIG. 14 shows a flowchart illustrating a method 1400 for determining a packet is associated with an overlapping basic service set in accordance with various aspects of the present disclosure. The operations of method 1400 may be implemented by a wireless device, such as an AP 105 or STA 110, or its components as described with reference to FIGS. 1-10. For example, the operations of method 1400 may be performed by the OBSS identification component 610 as described with reference to FIGS. 6-9. In some examples, an AP 105 or a STA 110 may execute a set of codes to control the functional elements of the wireless device, such as an AP 105 or a STA 110, to perform the functions described below. Additionally or alternatively, the wireless device, such as an AP 105 or a STA 110, may perform aspects the functions described below using special-purpose hardware. The method 1400 may, additionally or alternatively, incorporate aspects of methods 1100, 1200, and 1300 of FIGS. 11-13.

At block 1405, the wireless device, such as an AP 105 or a STA 110, may generate a WLAN packet comprising a preamble, a data region, and an identification mechanism associated with the OBSS as described with reference to FIGS. 2-5. In some cases, the wireless device, such as an AP 105 or a STA 110, may generate a WLAN packet comprising a preamble, a data region, and an identification mechanism associated with a BSS as described with reference to FIGS. 2-5. In some examples, the operations of block 1405 may be performed by the packet generator 810 as described with reference to FIG. 8.

At block 1410, the wireless device, such as an AP 105 or a STA 110, may insert the identification mechanism into a portion of the data region associated with the WLAN packet as described with reference to FIGS. 2-5. In some cases, In some cases, the wireless device, such as an AP 105 or a STA 110, may insert the identification mechanism into a portion of a service field associated with the WLAN packet, or a delimiter field associated with a MAC header, or a combination thereof examples, the operations of block 1410 may be performed by the packet type identifier 715 as described with reference to FIG. 7.

At block 1415, the wireless device, such as an AP 105 or a STA 110, may transmit the WLAN packet over a channel that is shared with an OBSS as described with reference to FIGS. 2-5. In some examples, the operations of block 1415 may be performed by the transmitter 615 as described with reference to FIG. 6.

Figure 15:
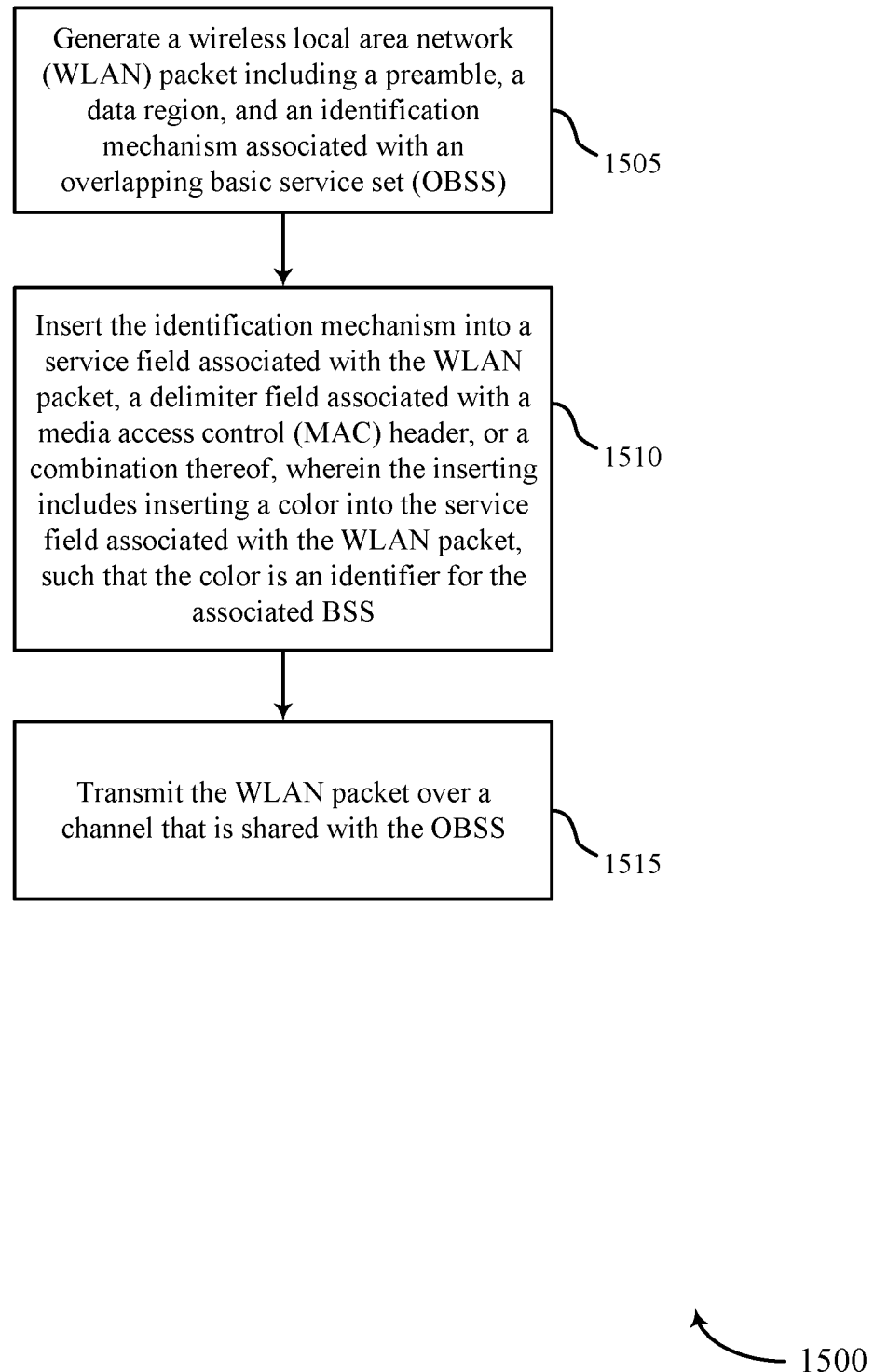

FIG. 15 shows a flowchart illustrating a method 1500 for determining a packet is associated with an overlapping basic service set in accordance with various aspects of the present disclosure. The operations of method 1500 may be implemented by a wireless device, such as an AP 105 or a STA 110, or its components as described with reference to FIGS. 1-10. For example, the operations of method 1500 may be performed by the OBSS identification component 610 as described with reference to FIGS. 6-9. In some examples, an AP 105 or a STA 110 may execute a set of codes to control the functional elements of the wireless device, such as an AP 105 or a STA 110, to perform the functions described below. Additionally or alternatively, the wireless device, such as an AP 105 or a STA 110, may perform aspects the functions described below using special-purpose hardware. The method 1500 may, additionally or alternatively, incorporate aspects of methods 1100, 1200, 1300, and 1400 of FIGS. 11-14.

At block 1505, the wireless device, such as an AP 105 or a STA 110, may generate a WLAN packet comprising a preamble, a data region, and an identification mechanism associated with an OBSS as described with reference to FIGS. 2-5. In some cases, the wireless device, such as an AP 105 or a STA 110, may generate a WLAN packet comprising a preamble, a data region, and an identification mechanism associated with a BSS as described with reference to FIGS. 2-5. In some examples, the operations of block 1505 may be performed by the packet generator 810 as described with reference to FIG. 8.

At block 1510, the wireless device, such as an AP 105 or a STA 110, may insert the identification mechanism (e.g., OBSS identification mechanism) into at least one of a service field associated with the WLAN packet, a delimiter field associated with a MAC header, or a combination thereof as described with reference to FIGS. 2-5. In some cases, the inserting comprises inserting a BSS identifier into the service field associated with the WLAN packet. In other cases, the inserting comprises inserting a BSS identifier into the delimiter field associated with the MAC header. Additionally, a BSS identifier may include the identification mechanism. In some examples, the operations of block 1510 may be performed by the packet type identifier 715 as described with reference to FIG. 7.

At block 1515, the wireless device, such as an AP 105 or a STA 110, may transmit the WLAN packet over a channel that is shared with an OBSS as described with reference to FIGS. 2-5. In some examples, the operations of block 1515 may be performed by the transmitter 615 as described with reference to FIG. 6.

Thus, methods 1100, 1200, 1300, 1400, and 1500 may provide for determining a packet is associated with an overlapping basic service set. It should be noted that methods 1100, 1200, 1300, 1400, and 1500 describe possible implementation, and that the operations and the steps may be rearranged or otherwise modified such that other implementations are possible. In some examples, aspects from two or more of the methods 1100, 1200, 1300, 1400, and 1500 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Additionally or alternatively, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may, additionally or alternatively, be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may, additionally or alternatively, be physically located at various positions, including being distributed such that portions of functions are implemented at different physical locations. Additionally or alternatively, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are, additionally or alternatively, included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a wireless device associated with an overlapping basic service set (OBSS), comprising:
   receiving a wireless local area network (WLAN) packet comprising a preamble and a data region;
   attempting to identify whether the preamble comprises a first identification mechanism associated with the OBSS;
   determining, based at least in part on the attempting, that there is insufficient information to decide that the wireless local area network (WLAN) packet is associated with the OBSS;
   decoding at least a portion of the data region based at least in part on the determining, wherein the decoding comprises decoding a media access control (MAC) header within the data region;
   identifying a second OBSS identification mechanism based at least in part on the decoding; and
   determining that the WLAN packet is associated with the OBSS based at least in part on the second OBSS identification mechanism and based at least in part on the decoded medium access control (MAC) header.

2. The method of claim 1, wherein the OBSS identification mechanism comprises a frame check sequence (FCS) associated with the data region, a cyclic redundancy check (CRC) in a delimiter field associated with the data region, a CRC in a service field associated with the data region, or a combination thereof.

3. The method of claim 1, further comprising:
   applying a frame check sequence (FCS) to a data unit associated with the MAC header; and
   wherein decoding the MAC header is based at least in part on the applied FCS.

4. The method of claim 1, further comprising:
   applying, to the MAC header, a cyclic redundancy check (CRC) in a delimiter field associated with the MAC header; and
   wherein decoding the MAC header is based at least in part on the applied cyclic redundancy check (CRC).

5. The method of claim 1, further comprising:
applying, to the MAC header, a cyclic redundancy check (CRC) in a service field associated with the WLAN packet; and
wherein decoding the MAC header is based at least in part on the applied CRC.

6. The method of claim 1, wherein the decoding comprises:
identifying, in the data region, an indication that the WLAN packet is associated with the OBSS; and
wherein determining that the WLAN packet is associated with the OBSS based at least in part on the indication.

7. A method of wireless communication at a wireless device associated with an overlapping basic service set (OBSS), comprising:
generating a wireless local area network (WLAN) packet comprising a preamble and a data region;
determining whether to include in the preamble a first identification mechanism associated with the OBSS;
generating, based at least in part on the determining, a second identification mechanism associated with the OBSS, wherein the second identification mechanism comprises an indication that the WLAN packet is associated with the OBSS, for a user equipment (UE) to decode the data region to determine that the WLAN packet is associated with the OBSS;
inserting, based at least in part on the generating, the second identification mechanism into a portion of the data region associated with the WLAN packet; and
transmitting the WLAN packet over a channel that is shared with the OBSS.

8. The method of claim 7, wherein the inserting comprises inserting a cyclic redundancy check (CRC) to decode a MAC header into a delimiter field associated with a MAC header of the portion of the data region.

9. The method of claim 7, wherein the inserting comprises inserting a cyclic redundancy check (CRC) to decode a MAC header into a service field associated with the portion of the data region of the WLAN packet.

10. The method of claim 7, wherein the inserting comprises inserting a BSS identifier into a service field associated with the WLAN packet.

11. The method of claim 7, further comprising:
determining to include in the preamble the first identification mechanism associated with the OBSS; and
inserting, based at least in part of the determining, the first identification mechanism into the preamble.

12. An apparatus for wireless communication at a wireless device associated with an overlapping basic service set (OBSS), comprising:
a processor;
memory in electronic communication with the processor; and
instructions stored in the memory and operable, when executed by the processor, to cause the apparatus to:
receive a wireless local area network (WLAN) packet comprising a preamble and a data region;
attempt to identify whether the preamble comprises a first identification mechanism associated with the OBSS;
determine, based at least in part on the attempting, that there is insufficient information to decide that the wireless local area network (WLAN) packet is associated with the OBSS;
decode at least a portion of the data region based at least in part on the determining, wherein the decoding comprises decoding a media access control (MAC) header within the data region;
identify a second OBSS identification mechanism based at least in part on the decoding; and
determine that the WLAN packet is associated with the OBSS based at least in part on the second OBSS identification mechanism and based at least in part on the decoded medium access control (MAC) header.

13. The apparatus of claim 12, wherein the OBSS identification mechanism comprises a frame check sequence (FCS) associated with the data region.

14. The apparatus of claim 12, wherein the OBSS identification mechanism comprises a cyclic redundancy check (CRC) in a delimiter field associated with the data region.

15. The apparatus of claim 12, wherein the OBSS identification mechanism comprises a CRC in a service field associated with the data region.

16. The apparatus of claim 12, wherein the instructions are operable to cause the processor to:
apply a frame check sequence (FCS) to a data unit associated with the MAC header; and
decode the MAC header is based at least in part on the applied FCS.

17. The apparatus of claim 12, wherein the instructions are operable to cause the processor to:
apply, to the MAC header, a cyclic redundancy check (CRC) in a delimiter field associated with the MAC header; and
decode the MAC header is based at least in part on the applied cyclic redundancy check (CRC).

18. The apparatus of claim 12, wherein the instructions are operable to cause the processor to:
apply, to the MAC header, a cyclic redundancy check (CRC) in a service field associated with the WLAN packet; and
decode the MAC header is based at least in part on the applied CRC.

19. The apparatus of claim 12, wherein the instructions are operable to cause the processor to:
identify the MAC header is based at least in part on identifying a first bit pattern associated with a first field and a second bit pattern associated with a second field that are both associated with the MAC header.

20. The apparatus of claim 12, wherein the instructions are operable to cause the apparatus to:
identify, in the data region, an indication that the WLAN packet is associated with the OBSS; and
determine that the WLAN packet is associated with the OBSS based at least in part on the indication.

21. The apparatus of claim 20, wherein the identifying the indication comprises identifying a BSS identifier in a delimiter signature field associated with a MAC header.

22. The apparatus of claim 21, wherein the instructions are operable to cause the processor to:
apply, to the delimiter signature field, a cyclic redundancy check (CRC) in a delimiter field associated with the MAC header; and
decode the delimiter signature field based at least in part on the applied CRC.

23. The apparatus of claim 12, wherein the instructions are operable to cause the processor to:
compare a received signal strength of the WLAN packet with a threshold when it is determined the WLAN packet is associated with the OBSS.

24. The apparatus of claim 23, wherein the instructions are operable to cause the processor to:
discard at least one of a physical protocol data unit (PPDU) duration, a transmit opportunity (TXOP) duration, a network allocation vector (NAV) information, or any combination thereof based at least in part on the comparison.

25. An apparatus for wireless communication at a wireless device associated with an overlapping basic service set (OBSS), comprising:
a processor;
memory in electronic communication with the processor; and
instructions stored in the memory and operable, when executed by the processor, to cause the apparatus to:
generate a wireless local area network (WLAN) packet comprising a preamble and a data region;
determine whether to include in the preamble a first identification mechanism associated with the OBSS;
generate, based at least in part on the determining, a second identification mechanism associated with the OBSS, wherein the second identification mechanism comprises an indication that the WLAN packet is associated with the OBSS for a user equipment (UE) to decode the data region to determine that the WLAN packet is associated with the OBSS;
insert, based at least in part on the generating, the second identification mechanism into a portion of the data region associated with the WLAN packet; and
transmit the WLAN packet over a channel that is shared with the OBSS.

26. The apparatus of claim 25, wherein the instructions are operable to cause the apparatus to:
insert a cyclic redundancy check (CRC) to decode a MAC header into a delimiter field associated with a MAC header of the portion of the data region.

27. The apparatus of claim 25, wherein the instructions are operable to cause the apparatus to:
insert a cyclic redundancy check (CRC) to decode a MAC header into a service field associated with the portion of the data region of the WLAN packet.

28. The apparatus of claim 25, wherein the instructions are operable to cause the apparatus to:
insert a BSS identifier into a service field associated with the WLAN packet.

* * * * *